United States Patent [19]
Nobumoto et al.

[11] Patent Number: 5,213,011
[45] Date of Patent: May 25, 1993

[54] POWER TRANSMISSION DEVICE FOR VEHICLE

[75] Inventors: Hidetoshi Nobumoto; Seiji Esaki; Seiji Terauchi; Osamu Sado; Kazuhiko Ueda, all of Hiroshima, Japan

[73] Assignee: Mazda Motor Corporation, Hiroshima, Japan

[21] Appl. No.: 863,174

[22] Filed: Apr. 3, 1992

[30] Foreign Application Priority Data

| Apr. 5, 1991 | [JP] | Japan | 3-72828 |
| Apr. 26, 1991 | [JP] | Japan | 3-125458 |
| Apr. 26, 1991 | [JP] | Japan | 3-125459 |
| Jun. 7, 1991 | [JP] | Japan | 3-136439 |
| Jun. 11, 1991 | [JP] | Japan | 3-138844 |

[51] Int. Cl.$^5$ .............................................. F16H 61/02
[52] U.S. Cl. ........................................ 74/862; 475/216
[58] Field of Search ............... 74/862; 475/191, 192, 475/215, 216

[56] References Cited

U.S. PATENT DOCUMENTS

| 4,261,229 | 4/1981 | Mizumo et al. | 74/862 X |
| 4,628,766 | 12/1986 | de Brie Perry | 475/216 |
| 4,872,371 | 10/1989 | Fellows | 475/216 |
| 5,020,384 | 6/1991 | Kraus | 475/216 |
| 5,074,830 | 12/1991 | Perry | 475/216 |
| 5,103,693 | 4/1992 | Hibi | 74/862 X |

FOREIGN PATENT DOCUMENTS

62-202564 12/1987 Japan.
2-240444 9/1990 Japan.

Primary Examiner—Dirk Wright
Attorney, Agent, or Firm—Sixbey, Friedman, Leedom & Ferguson

[57] ABSTRACT

A power transmission device for a vehicle comprises a first power transmitting path for transmitting engine output to a wheel side via a reduction gear, a second power transmitting path for transmitting engine output to the wheel side via a stepless speed change gear mechanism, a path switching clutch for switching between the paths to transmit by one of the paths, a switch-over control part for controlling switch-over operation of the clutch according to a driving condition of the vehicle, and a rotational condition abrupt change restraining part for restraining an abrupt change of a rotational condition of an engine output shaft at switch-over between the paths. The restraining part adjusts to conform rotating speeds of the input and output sides of the clutch to each other at switch-over of the clutch, or conform output torque to the wheel side between before and after switch-over of the clutch. Thus, an abrupt change of rotation of the engine output shaft is restrained to prevent a shock owing to switch-over, and the durability of a friction element is enhanced.

19 Claims, 21 Drawing Sheets

F I G .12
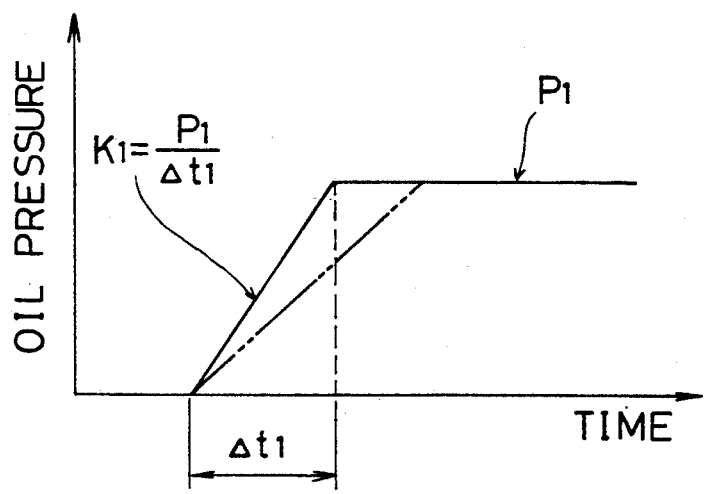
F I G .13
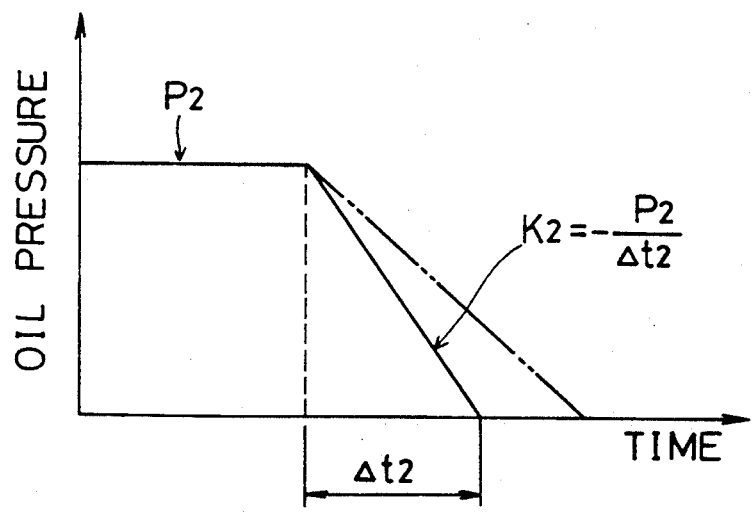

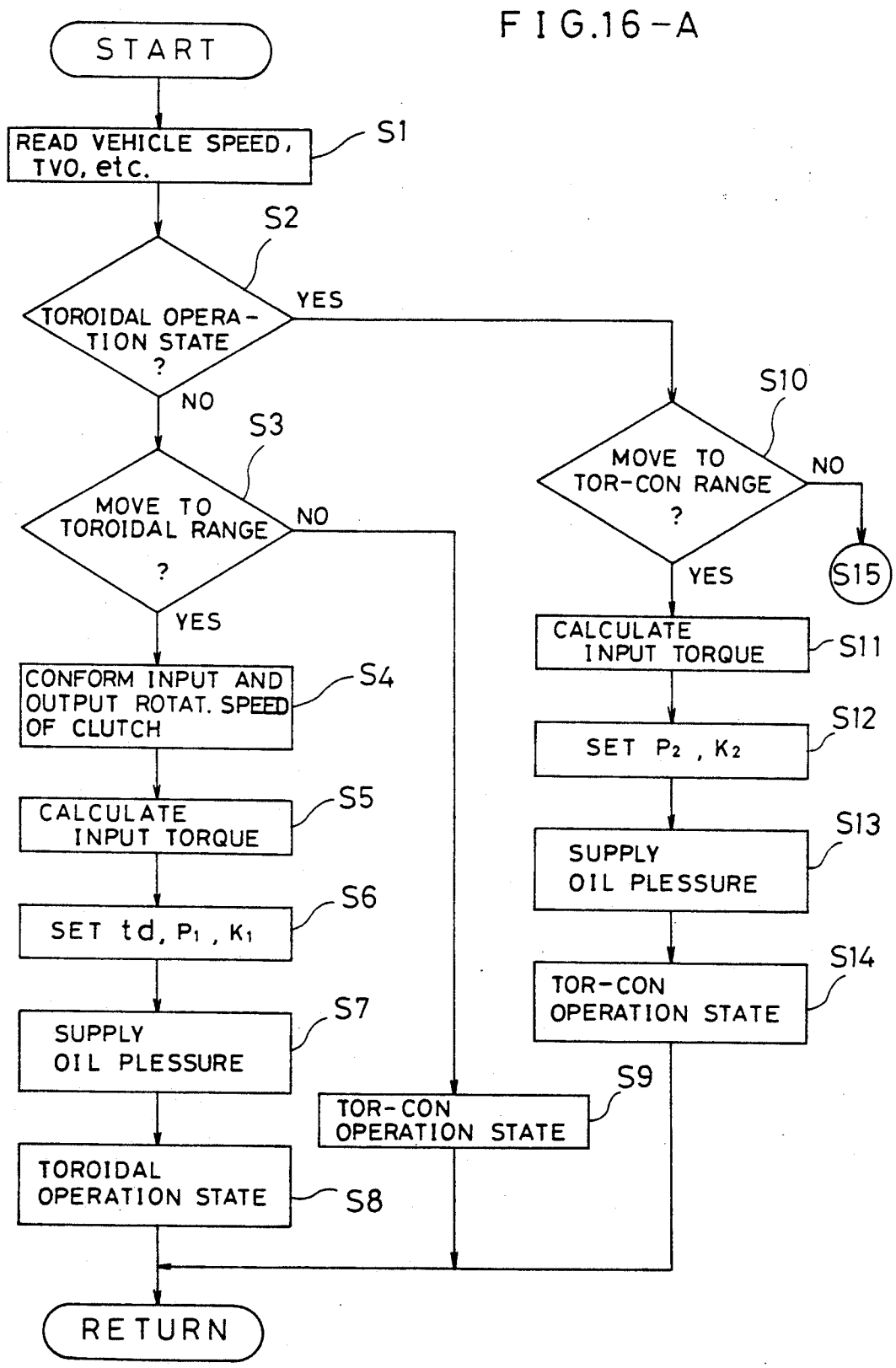
FIG.16-A

FIG.16-B
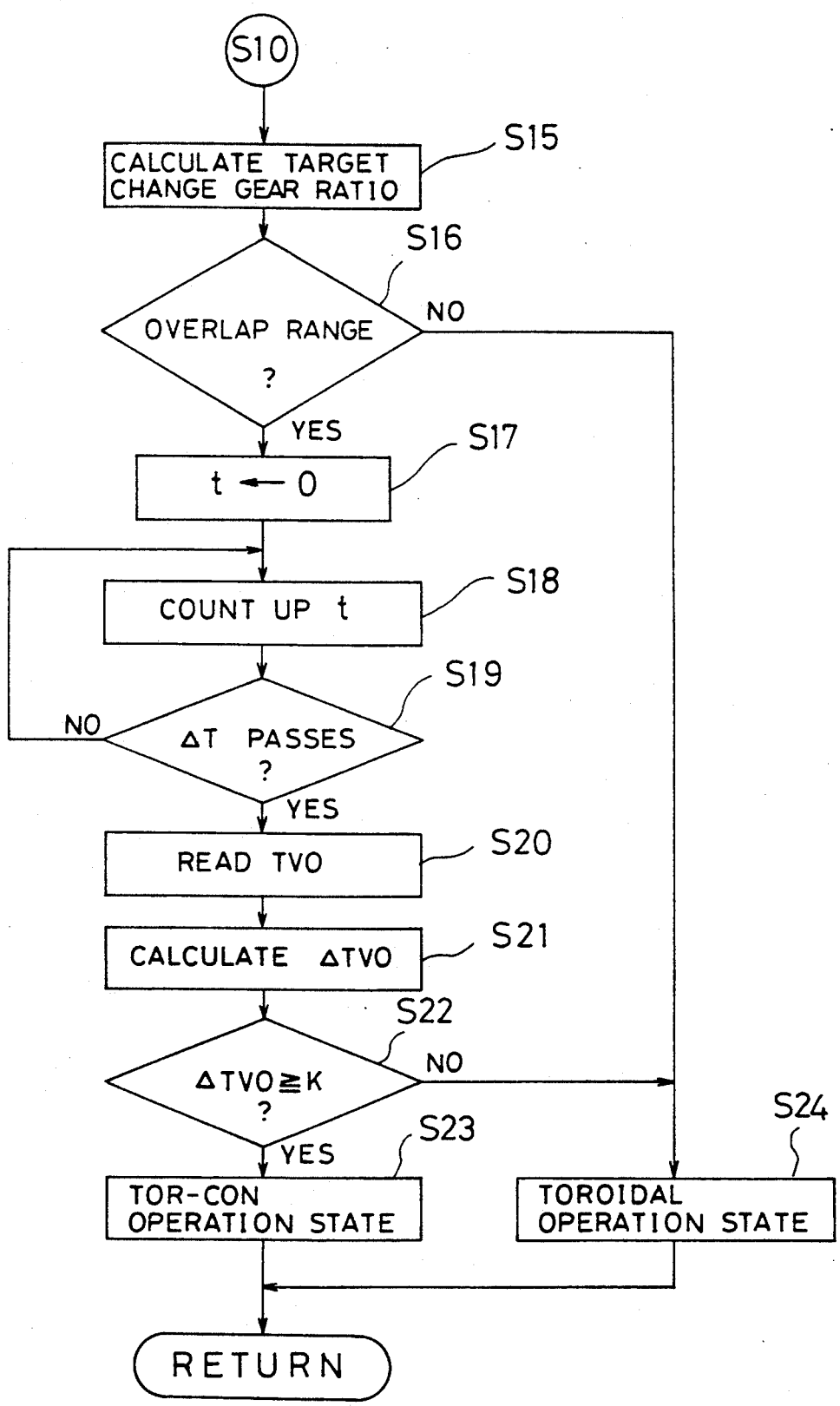

POWER TRANSMISSION DEVICE FOR VEHICLE

BACKGROUND OF THE INVENTION

This invention relates to a power transmission device for a vehicle having a first power transmitting path with a reduction gear and a second power transmitting path with a stepless speed change gear mechanism so as to transmit power by one of the paths according to a driving condition of the vehicle.

Conventionally, there has been a known power transmission device for transmitting an engine output of a vehicle including a first power transmitting path with a reduction gear (at least one-step speed change mechanism), a second power transmitting path with a stepless speed change gear mechanism and a clutch for switching the paths (for example, lockup clutch), wherein the first and second paths are switched by connecting and disconnecting the clutch according to the driving condition of the vehicle so as to transmit the power by one of the paths (refer to Japanese Patent Application Laying Open Gazette No. 2-240444).

The power transmission device is set so as to obtain a comparatively large change gear ratio at the first path and a continuously changeable change gear ratio in a range of a comparatively small change gear ratio, and to transmit the engine output, for example, by the first path when the driving condition is in a driving range of low vehicle speed and by the second path when the driving condition is in a driving range of high vehicle speed. Thus, the appropriate change gear ratio is set and adjusted in each driving range.

Such the kind of power transmission device, however, cause a shock owing to switch-over of the paths by a clutch operation and the clutch is worn out in short period.

SUMMARY OF THE INVENTION

It is an object of the invention to provide a power transmission device in which a shock owing to the switch-over of the power transmitting paths is lessened and the durability of a friction element for switching a clutch or the like is enhanced.

To attain the above object, a power transmission device for a vehicle comprises a first power transmitting path for transmitting an engine output to a wheel side via a reduction gear, a second power transmitting path for transmitting the engine output to the wheel side via a stepless speed change gear mechanism, a friction element (for example, a clutch) for switching the paths so as to transmit power by one of the paths, switch-over control means for controlling a switch-over operation of the friction element, according to a driving condition of the vehicle, and rotational condition abrupt change restraining means for restraining an abrupt change of a rotational condition of an engine output shaft at switch-over between the paths. The rotational condition abrupt change restraining means is, particularly, rotating speed adjusting means for adjusting to approximately conform rotating speed of input side and rotating speed of output side of the friction element to each other at switch-over between the paths, or output torque control means for controlling to approximately conform output torques to the wheel side between before and after switch-over of the paths to each other.

Under the above construction, since an abrupt change of the rotational condition of the engine output shaft is restrained by the rotational condition abrupt change restraining means at switch-over of the paths by operating the friction element, a member on the input side and that on the output side of the friction element are smoothly engaged with each other and the output torque to the wheel side is constant between before and after the switch-over. Thus, a shock owing to switch-over is prevented, enhancing the durability of the friction element.

Other and further objects, features and advantages of the invention will appear more fully from the following description.

BRIEF DESCRIPTION OF THE DRAWINGS

Accompanying drawings show preferred embodiments of the present invention, in which FIGS. 1-16 show a first embodiment.

FIG. 1 is a schematic illustration showing a whole construction of a power transmission device.

FIG. 2 is a block diagram schematically showing a transmission process of the power transmission device.

FIG. 3 is a sectional view of a stepless speed change gear mechanism taken along the line III—III in FIG. 1.

FIG. 4 is a sectional view showing an arrangement of wires, seen along the line IV—IV in FIG. 3.

FIG. 5 is an enlarged view showing an arrangement of first or second wire in FIG. 4.

FIG. 6 is a view seen from an arrow VI in FIG. 5.

FIG. 7 is an enlarged view showing a vicinity of one of hydraulic actuators in FIG. 3.

FIG. 8 is a block diagram showing a hydraulic control circuit.

FIG. 9 is a block diagram showing a function of control system.

FIG. 10 is a graph showing a range of change gear ratio variation of each power transmitting path.

FIG. 11 is a graph indicating a relationship between an input torque at a switch-over operation of a path switching clutch and connected period or disconnected period.

FIG. 12 is a graph showing a variation of an oil pressure in a clutch operation at the path switching clutch connected.

FIG. 13 is a graph showing a variation of the oil pressure in a clutch operation at the path switching clutch disconnected.

FIG. 14 is a graph showing a relation between a switch-over point of the path switching clutch and an input torque.

FIG. 15 is a graph showing a relation between the switch-over point of the path switching clutch and change ratio of the input torque.

FIGS. 16-A and 16-B are flow charts for switch-over control of the path switching control clutch.

DETAILED DESCRIPTION OF THE PREFERRED EMBODIMENT

Description of the preferred embodiments is made below with reference to accompanying drawings.

Figure 1:
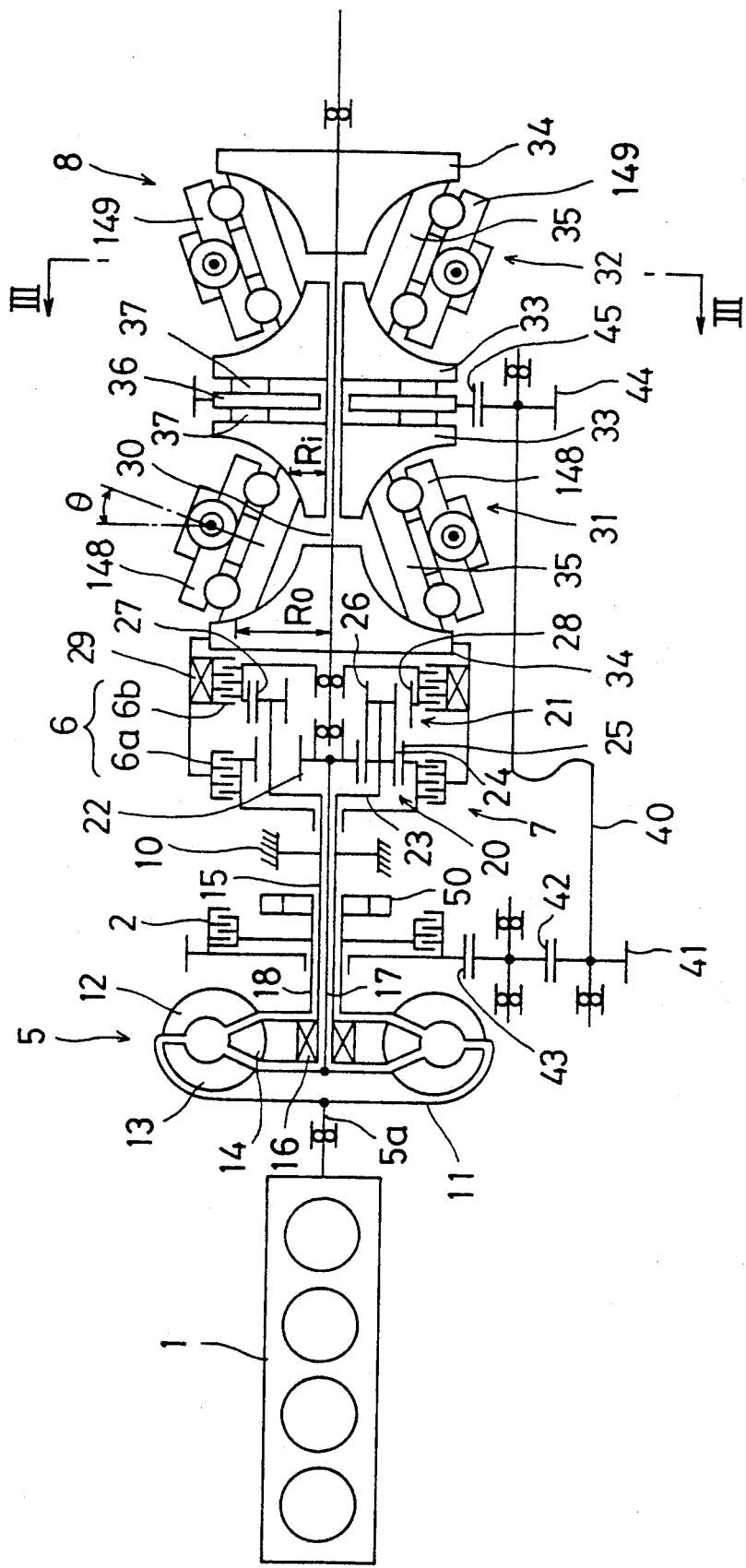
Figure 2:
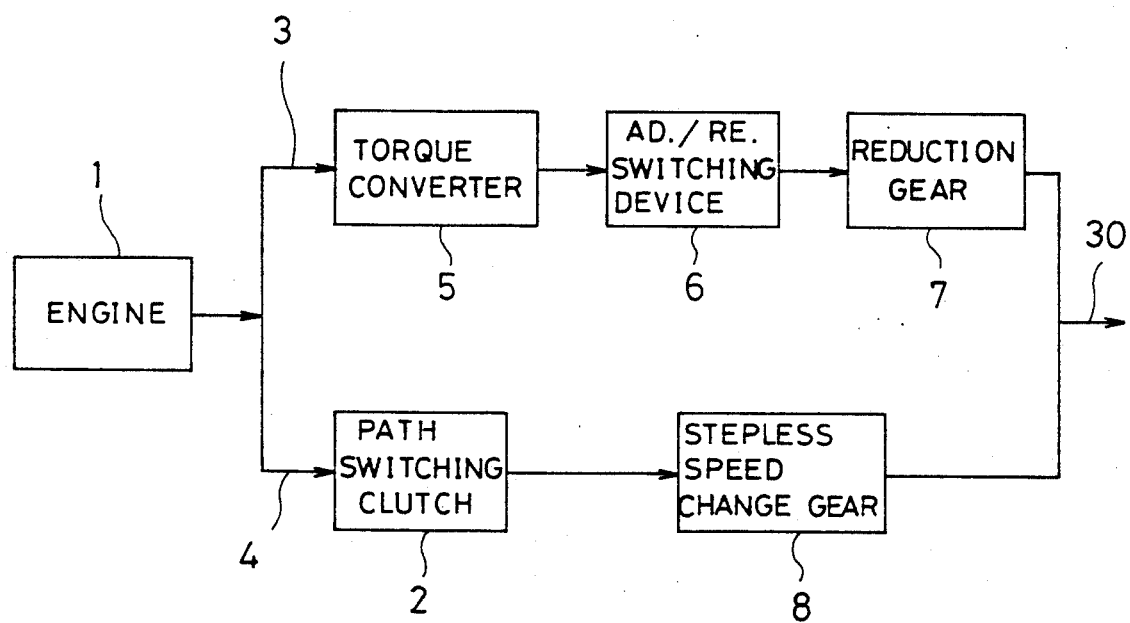

FIGS. 1 and 2 show a construction of power transmitting paths of a power transmission device for a vehicle according to a first embodiment of the present invention. In the drawings, the power transmission device connected to an output side of an engine 1 has first and second power transmitting paths 3, 4 alternatively switched therebetween by a clutch 2 as a friction element for switching the paths. The first power transmitting path 3 transmits engine output to a wheel side via a reduction gear 7; in this embodiment via a torque converter 5, an advance/reverse switching device 6 and a reduction gear 7. The second power transmitting path 4 transmits the engine output to the wheel side via a stepless speed change gear mechanism 8.

The torque converter 5 includes in a pump cover 11 connected to an input shaft 5a thereof, a pump impeller 12 formed integrally rotatably with the pump cover 11 therein, a turbine liner 13 opposed to the pump impeller 12, and a stator 14 mounted to a fixed hollow shaft 15 via a one-way clutch 16 between the pump impeller 12 and the turbine liner 13. The input shaft 5a and the turbine liner 13 are respectively connected to an engine output shaft and a turbine shaft 17 as an output shaft. An oil as a working fluid is filled in the pump cover 11. A rotaly hollow shaft 18 is connected to the pump impeller 12. An oil pump 50 is mounted to a rear end of the shaft 18. The fixed hollow shaft 15 is fixed to a casing 10.

The reduction gear 7 has two planetary gear mechanisms 20, 21 respectively for reverse and advance arranged coaxially with the turbine shaft 17 in series. A common sun gear 22 used for both planetary gear mechanisms 20, 21 is connected to the turbine shaft 17.

The planetary gear mechanism 20 for reverse is of single pinion type for transmitting rotation of the sun gear 22 to a ring gear 25 via a pinion 24 supported to a carrier 23. The carrier 23 is fixed to the casing 10 in such a fashion that the carrier 23 is connected to the fixed hollow shaft 15. The ring gear 25 is connected to an output shaft 30 via a reverse clutch 6a. The planetary gear mechanism 21 for advance is of double pinion type for transmitting the rotation of the sun gear 22 to a ring gear 28 via an inner pinion 26 and outer pinion 27 both supported to the carrier 23. The ring gear 28 is connected to the output shaft 30 via a forward clutch 6b and a one-way clutch 29.

The advance/reverse switching device 6 is composed of the reverse clutch 6a and the forward clutch 6b. When the reverse clutch 6a is connected, a power (torque) from the turbine shaft 17 is transmitted to the output shaft 30 via the reverse planetary gear mechanism 20. When the forward clutch 6b is connected, the power from the turbine shaft 17 is transmitted to the output shaft 30 via the advance planetary gear mechanism 21.

The stepless speed change gear mechanism 8 of the second power transmitting path 4 is composed of first and second speed change units 31, 32 arranged adjacent to the reduction gear 7 and coaxial with the output shaft 30 in series. Each speed change unit 31, 32 is a toroidal stepless speed change gear mechanism and has an input disk 33 relatively rotatably mounted on the output shaft 30, an output disk 34 opposed to the input disk 33 and integrally rotatably mounted on the output shaft 30, and a pair of inclinable rollers 35 interposed between both disks 33, 34 so as to contact to both disks 33, 34 to rotate accompanying with the input disk 33. Each inclined angle $\theta$ of the rollers 35 is changed by a driving mechanism (to be described later), so that the change gear ratios of each speed change unit 31, 32 are changed according thereto. In other words, the change gear ratios when rotation of the input disk 33 is transmitted to the output disk via the rollers 35 correspond to a ratio between a radius Ri at a point where the roller 35 contacts with the input disk 33 and a radius Ro at a point where the roller 35 contacts with the output disk 34. The change gear ratios are changed by changing the contacting points according to inclining the rollers 35.

Both speed change units 31, 32 are located in a such a fashion that the respective input disks 33 are adjacent to each other and the respective output disk 34 are apart to each other. An intermediate disk 36 is interposed between the input disks 33 of each speed change unit 31, 32. A plurality of loading cams 37 are interposed between the intermediate disk 36 and each input disk 33 so as to increase a pressing force to each input disk 33 by each cam 37 as an input torque inputted to each input disk 33 from the engine 1 increases.

The power is inputted to the stepless speed change gear mechanism 8 via a bypass shaft 40 arranged in parallel with the turbine shaft 17 and the output shaft 30. In detail, provided at a front end of the bypass shaft 40 is a first gear 41 connected to a second gear 43 via an idle gear 42. The second gear 43 is connected via the clutch 2 to a rotary hollow shaft 18 interconnected with a torque converter input side (the pump impeller 12). Provided at a rear end of the bypass shaft 40 is a third gear 44 engaged with a fourth gear 45 provided at the intermediate disk 36.

Accordingly, when the clutch 2 is in OFF state, transmission between the rotary hollow shaft 18 and bypass shaft 40 are intercepted and the engine output is transmitted to the output shaft 30 via the torque converter 5, the advance/reverse switching device 6 and the reduction gear 7 of the first power transmitting path 3. On the other hand, when the clutch 2 is in ON state, the engine output is transmitted to the rotary hollow shaft 18 bypassing the torque converter 5, then to the output shaft 30 via the gears 43, 42, 41, the bypass shaft 40, the gears 44, 45 and the stepless speed change gear mechanism 8. In this case, the first power transmitting path 3 substantially does not work because of the one-way clutch 29 free.

A reverse clutch 6a, a forward clutches 6b of the advance/reverse switching device 6 and the clutch 2 are switched over according to the driving condition of the vehicle as Table 1.

TABLE 1

|  | reverse | neutral | advance | |
|---|---|---|---|---|
|  |  |  | torque convertor range | toroidal range |
|  |  |  | ← → | |
|  |  |  | ← → | |
| reverse clutch | O | X | X | X |
| forward clutch | X | X | O | O (one-way clutch free) |

TABLE 1-continued

| | reverse | neutral | advance | |
| | | | torque convertor range | toroidal range |
| --- | --- | --- | --- | --- |
| | | | ←——→ | |
| | | | ←————→ | |
| path switching clutch | X | X | X (at abrupt acceleration ○) | ○ |

○: connected
X: disconnected

Figure 3:
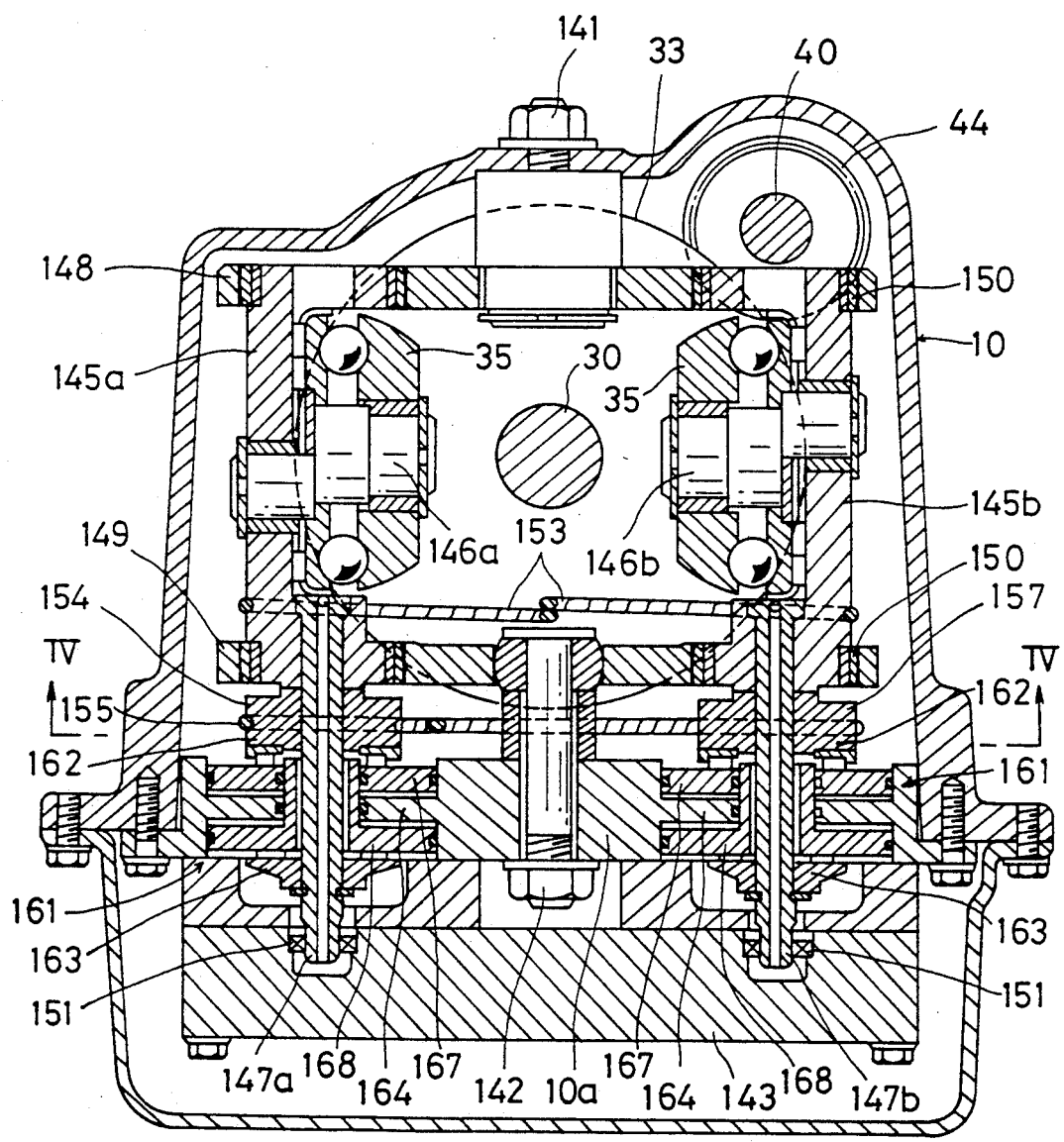
Figure 4:
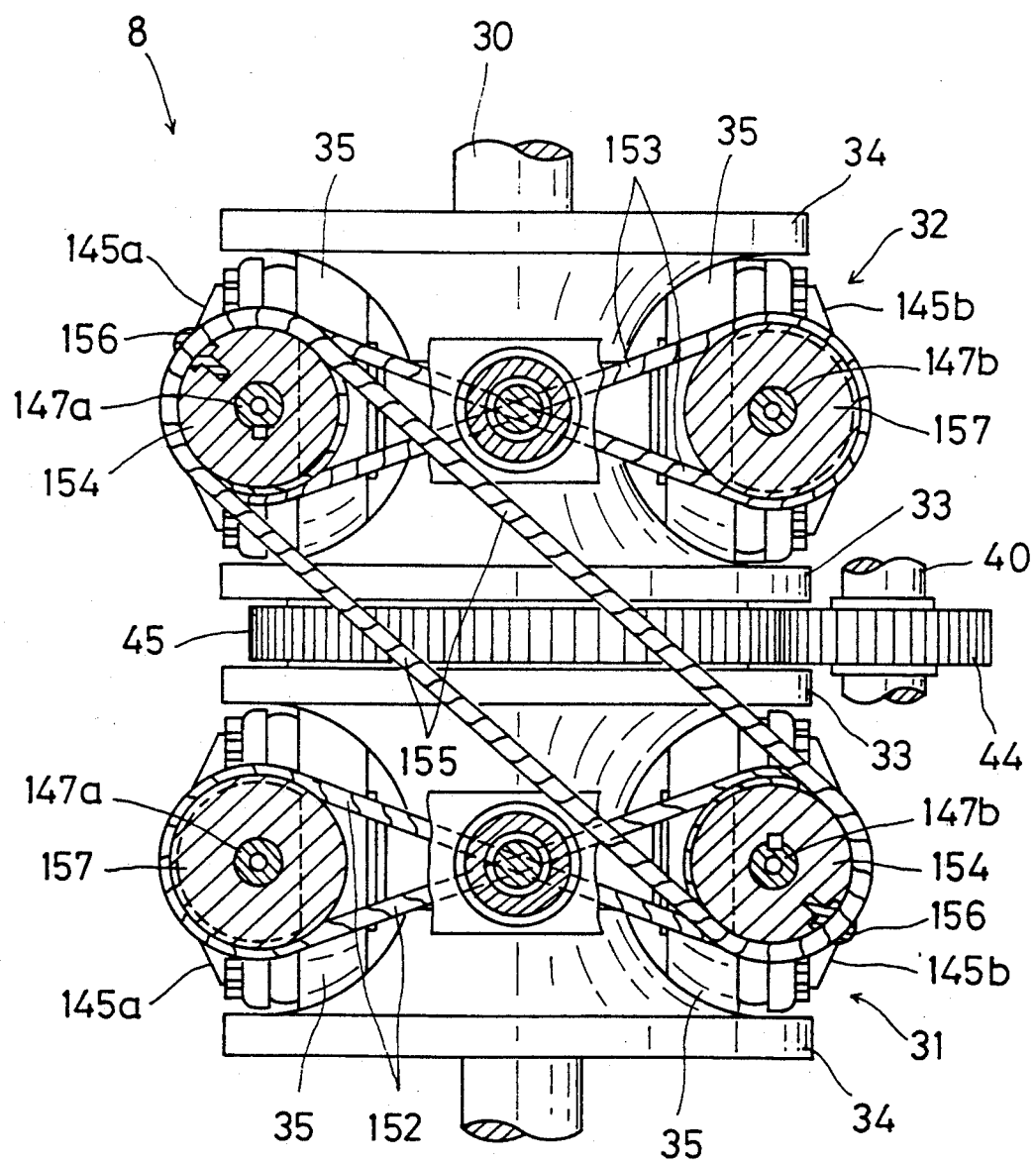

Description is made about the driving mechanism for inclining each pair of rollers 35 in first and second transmitting units 31, 32 composing the stepless speed change gear mechanism 8. As shown in FIGS. 3 and 4, each speed change unit 31, 32 has a pair of first and second trunnions 145a, 145b as roller support members for rotatably supporting the respective pair of the rollers 35. The rollers 35 are rotatably supported to the respective trunnions 145a, 145b via respective eccentric shafts 146a, 146b. Mounted integrally to the trunnions 145a, 145b are shaft members 147a, 147b extending in a direction orthogonal to the output shaft 4.

Mounted to a casing 10 (only shown in FIG. 3) of the stepless speed change gear mechanism 8 and a partition 10a integral with the casing 10 are supporting members 148, 149 via connecting members 141, 142. The supporting members 148, 149 rotatably support upper and bottom ends of the respective first and second trunnions 145a, 145b via ball bearings 150. Each bottom end of both shaft members 147a, 147b is rotatably supported to a member 143 of a casing side 10 side via bearings 151.

A first wire 152 as a first winding member is wound to each predetermined position of the first and the second trunnions 145a, 145b of the first speed change unit 31 to rotate the trunnions 145a, 145b thereof in opposite directions to each other. To each predetermined position of the first and the second trunnions 145a, 145b of the second speed change unit 32 a second wire 153 as a second winding member is wound to rotate the trunnions 145a, 145b thereof in opposite directions to each other. Respective pulleys 154 are integrally mounted to the shaft member 147b integral with the second trunnion 145b of the first speed change unit 31 and the shaft member 147a integral with the first trunnion 145a of the second speed change unit 32. A third wire 155 as a third winding member is wound between both pulleys 154 to rotate the pulleys 154 in a same direction. The third wire 155 is fixed to each pulley 154 by fixing members 156 (refer to FIG. 4). Under the above construction, rotation of one of the trunnions in each speed change unit 31, 32 is transmitted to the respective other trunnions, and rotation of one of the trunnions of the first or second speed change unit 31 or 32 is transmitted to the trunnion of the other speed change unit 32 or 31. Consequently, in case where something wrong happens in a hydraulic system for inclining each roller 35 of the first and second speed change units 31, 32, the rollers 35 of the first and second speed change units 31, 32 are inclined to a set inclined angle, synchronizing one another. Thus, each rotation of the input disks 33 in the first and second speed change units is transmitted to the respective output disks 34 with being speed changed with a set change gear ratio (reduction ratio) changed according to the inclined angle of each roller 35.

Figure 5:
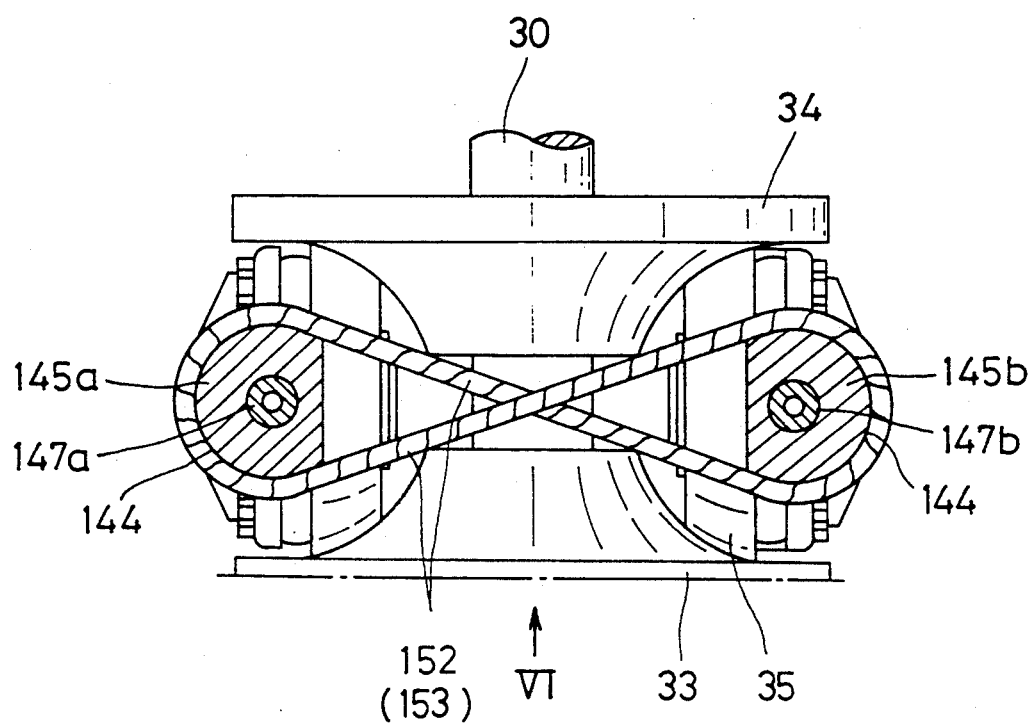
Figure 6:
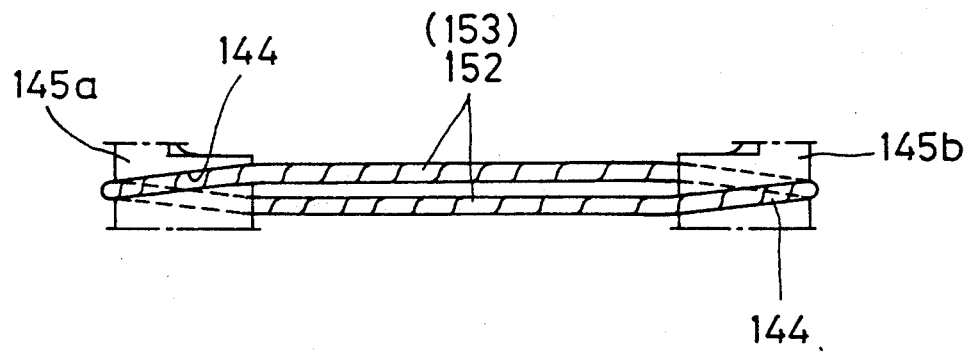

In this embodiment, respective spacers 157 are fitted to the shaft member 147a integral with the first trunnion 145a of the first speed change unit 31 and the shaft member 147b integral with the second trunnion 145b of the second speed change unit 32. In order to train first and second wires 152, 153 to the respective predetermined positions of the trunnion 145a, 145b of the first and second speed change units 31, 32 so as to rotate the trunnions 145a, 145b in the opposite directions to each other, as shown in FIGS. 5 and 6, spiral wire engaging grooves 144 for winding the first or second wire 152, 153 are formed on the first and second trunnions 145a, 145b respectively. Accordingly, as indicated in FIG. 6, the first or second wire 152 or 153 wound between the first and second trunnions 145a, 145b is prevented from containing to a crossing part, separating therefrom. Thus, each wire 152, 153 is avoided being worn out, enhancing the durability thereof.

Figure 7:
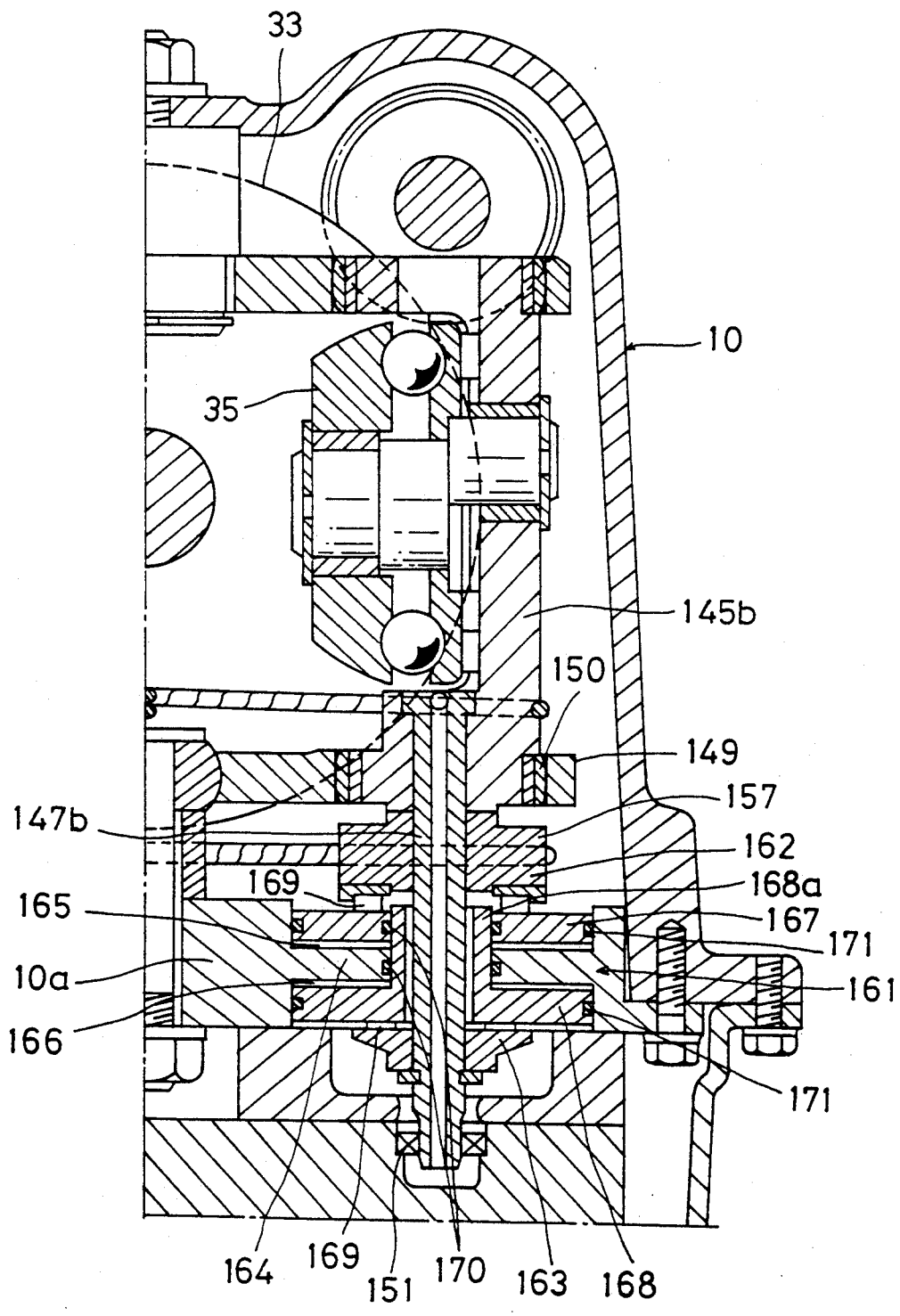

Each speed change unit 31, 32 has a hydraulic actuator 161 for inclining each roller 35 by moving the respective trunnions 145a, 145b in an axial direction for each trunnion 145a, 145b which supports the roller 35. Each hydraulic actuator 161 includes, as shown in FIG. 7 enlarged, a first movable flange 162, a second movable flange 163, a fixed flange 164 and a pair of pistons 167, 168. The first movable flange 162 is formed integrally with the spacer 157 or the pulley 154 and located at the outer periphery of the shaft members 147a, 147b. The second movable flange 163 is fixed to the shaft members 147a, 147b with a set space left between the first movable flange 162. The fixed flange 164 is integrally formed with the partition 10a so as to be located between both movable flanges 162, 163. The pistons 167, 168 are respectively arranged between the fixed flange 164 and the first or second movable flanges 162, 163, forming respective hydraulic chambers 165, 166 between the fixed flange 164, and contact relatively rotatably to the respective opposed movable flanges 162, 163 via bearings 169. Integrally formed on one of the pistons 168 is a cylindrical extension part 168a extending in the axial direction to the other piston 167 over the fixed flange 164, leaving a set space from an outer peripheral surface of the shaft members 147a, 147b. Inner peripheral surface of the fixed flange 164 and that of the other piston 167 are slidably supported to the outer peripheral surface of the extension part 168a, with being oil-sealed by oil rings 170. Each outer peripheral surface of the pistons 167, 168 is supported slidably to an outer concave surface of the partition 10a, with being oil-sealed by the oil rings 171.

Each hydraulic actuator 161 has hydraulic supply means 56 (in FIG. 8), described later, for independently introducing an oil pressure to each hydraulic chamber 165, 166. The shaft members 147a, 147b or trunnions 145a, 145b are moved to one side of the axial direction (upward in FIGS. 3 and 7), pressing the piston 167 to the first movable flange 162 by introducing the oil pressure to the hydraulic chamber 165, while the shaft members 147a, 147b or trunnions 145a, 145b are moved to the other side of the axial direction (downward in FIGS. 3 and 7), pressing the piston 168 to the second movable flange 163 by introducing the oil pressure to the hydraulic chamber 166. When the trunnions 145a, 145b are moved in the respective axial direction, each contact point to the respective input and output disks 33, 34 of the roller 35 rotatably supported to the respective trunnions 145a, 145b is changed to incline each roller 35. Accompanying therewith, each trunnion 145a, 145b rotates around an axis of the shaft members 147a, 147b.

Under the above construction, the pistons 167, 168 of each hydraulic actuator and each trunnion 145a, 145b are integrally moved without causing ricketiness in the axial direction between the pistons 167, 168 and each trunnion 145a, 145b or each shaft member 147a, 147b. Further, since the extension part 168a of the piston 168 and the shaft members 147a, 147b integral with each trunnion 145a, 145b are spaced apart, assembling errors of each trunnion 145a, 145b or each shaft member 147a, 147b to the casing 10 is lessened, so that the trunnions 145a, 145b or the shaft members 147a, 147b are moved smoothly.

Figure 8:
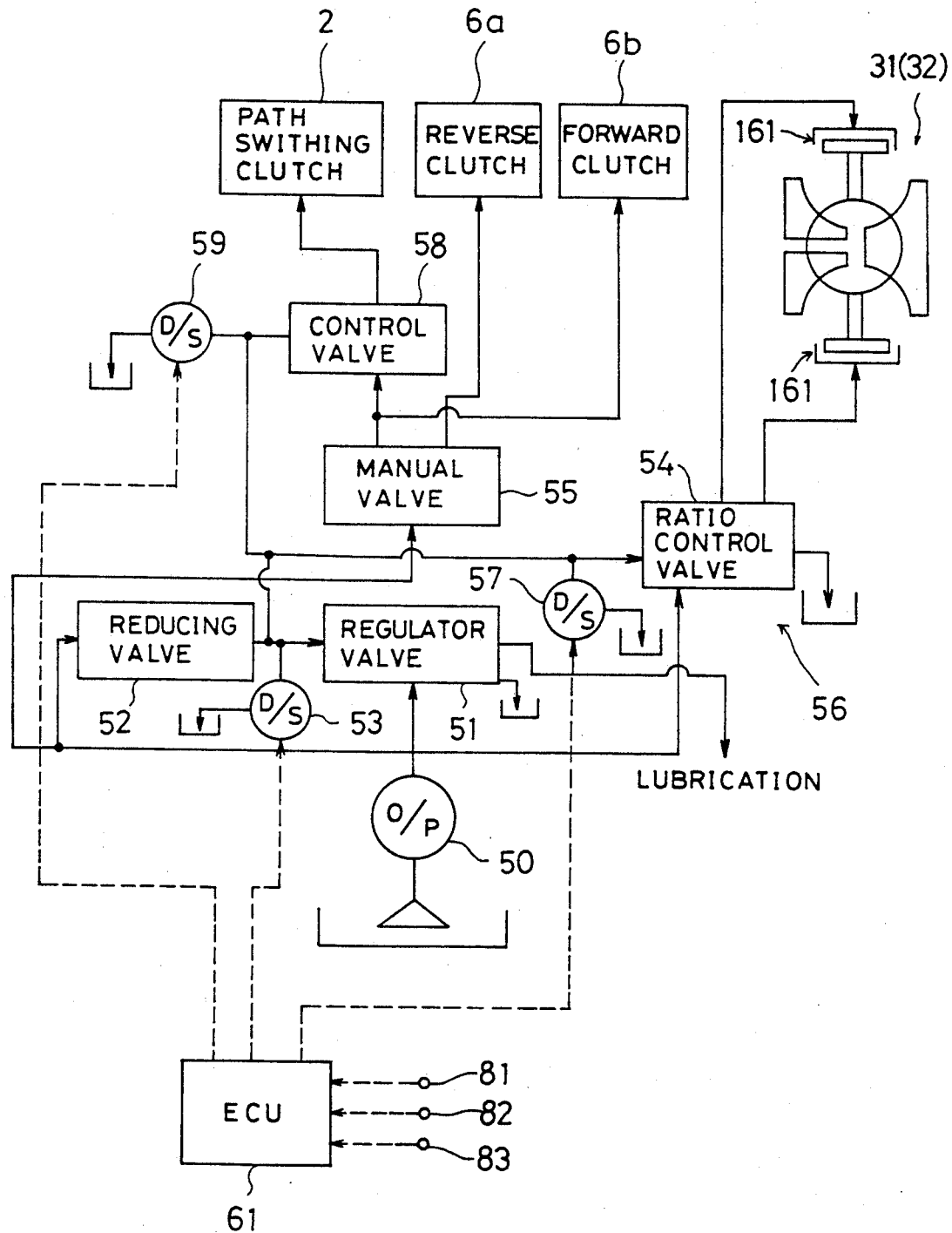

FIG. 8 shows a hydraulic control circuit for controlling a switch-over operation of each clutch 2, 6a, 6b and a change gear ratio of the stepless speed change gear mechanism 8. In this drawing, a regulator valve 51 adjusts an oil pressure (line pressure) of the working fluid discharged from the oil pump 50 according to a control pressure given from a reducing valve 52 via a pilot line. The pilot line connected to the regulator valve 51 is connected with a first duty solenoid valve 53 so as to control the line pressure by a duty control to the valve 53. The line pressure is forwarded to a ratio control valve 54 connected to the speed change units 31, 32 and to a manual valve 55.

The hydraulic line extending from the ratio control valve 54 is connected to a pair of the hydraulic actuator 161s in each speed change unit 31, 32. The hydraulic actuators incline the respective rollers 35, as described above, according to a hydraulic condition supplied to a pair of the hydraulic chambers 165, 166. The pilot line connected to the ratio control valve 54 is provided with a second duty solenoid valve 57 so that the hydraulic condition supplied to each hydraulic actuator 161 is controlled by a duty control to the valves 57 so as to control the change gear ratio by inclining the rollers 35 according thereto. In the hydraulic control circuit shown in FIG. 8, hydraulic supply means 56 for supplying the oil pressure to a pair of the hydraulic chambers 165, 166 of each hydraulic actuator 161 is composed of the oil pump 50, the ratio control valve 54, and the like and is one of elements of the hydraulic actuator 161.

The manual valve 55 is connected with an output line reaching to the path switching clutch 2 via a control valve 58, an output line reaching to the forward clutch 6b and an output line reaching to the reverse clutch 6a. The manual valve 55 is manually operated so as to supply the oil pressure to the reverse clutch 6a in a reverse range (R range) and to the forward clutch 6b and input side of the control valve 58 in an advance range (D range). The pilot line connected with the control valve 58 is connected to a third duty solenoid valve 59 so that the control valve 58 supplies, discharges and adjusts the oil pressure to the path switching clutch 2 according to the operation of the third duty solenoid valve 59.

Each duty solenoid valve 53, 57, 59 is controlled with each duty control signal outputted from an electric control unit 61 (hereinafter referred to as ECU). Inputted to the ECU 61 are a detected signal from a rotating speed sensor 81 for detecting engine rpm, a detected signal from vehicle speed sensor 82 for detecting a vehicle speed and a detected signal from a throttle sensor 83 for detecting a throttle opening.

The function of the ECU 61 is described below with reference to FIG. 9. The ECU 61 has line pressure control means 62 for controlling the first duty solenoid valve 53 according to an engine torque or the like, change gear ratio control means 63 for controlling the second duty solenoid valve 57 so that the change gear ratio of the stepless speed change gear mechanism 8 in a toroidal operation condition (as described later) reaches to a target change gear ratio set according to the driving condition of the vehicle, and path switch-over control means 64. The path switch-over control means 64 performs a fundamental control of switch-over of the path switching clutch 2 according to the driving condition of the vehicle during advancing, such as the vehicle speed. For example, the driving condition is in a power transmitting state by the first power transmitting path 3 (hereinafter referred to as a torque converter operation state) when the driving condition is in a specific driving range, such as a low vehicle speed range, and is in a power transmitting state by the second power transmitting path 4 (hereinafter referred to as a toroidal type speed change gear mechanism operation state, toroidal operation state) when the driving condition is in the other driving range. A driving range using the first power transmitting path 3 (hereinafter referred to as a torque converter range) and a driving range using the second power transmitting path 4 (hereinafter referred to as a toroidal range) are set beforehand by a map.

The ECU 61 further includes, as means relating to controls at a switch-over operation of the path switching clutch 2, rotating speed adjusting means 65, operation speed control means 66, torque detecting means 67, torque change ratio detecting means 68, switch-over point control means 69, abrupt acceleration detecting means 70 and correction means 71.

The rotating speed adjusting means 65 adjusts to conform rotating speed of input side of the path switching clutch 2 (rotating speed of the rotary hollow shaft 18) and rotating speed of output side of the clutch 2 (rotating speed of the gear 43) to each other at the switch-over operation of the clutch 2 from the connecting state (the torque converter operation state) to the disconnecting state (the toroidal operation state). In detail, the rotating speeds are adjusted by adjusting the change gear ratio of the stepless speed change gear mechanism 8 with the duty control to the second duty solenoid valve 57 within a range overlapping change gear ratio varying ranges of each power transmitting path 3, 4.

Figure 10:
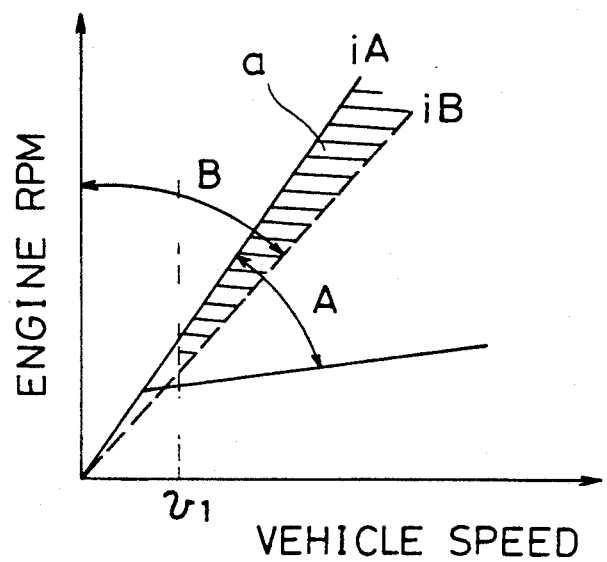

Consequently, even though the power transmission between the input side and the output side is intercepted when the clutch 2 is disconnected, the rotating speed of the output side of the clutch 2 is changed by changing the change gear ratio of the stepless speed change gear mechanism 8 since the disk and the like of the stepless speed change gear mechanism 8 rotate accompanied with the rotation of the output shaft 30 by the power transmitted from the first power transmitting path 3. As shown in FIG. 10, the change gear ratio varying range A by the second power transmitting path 4 is set at a comparatively small change gear ratio, and the change gear ratio varying range B by the first power transmitting path 3 is set at a comparatively large change gear ratio. The change gear ratio varying ranges A, B by each power transmitting path 3, 4 are partially overlapped by increasing the maximum change gear ratio iA of the second path 4 more than the minimum change gear ratio iB of the first path 3 (the change gear ratio of the reduction gear 7). Since the switch-over from the torque converter operation state to the toroidal operation state is performed within a range comparatively near the minimum change gear ratio of the first path 3, the rotating speeds of the input side and output side are conformed to each other before the connection of path switching clutch 2 by adjusting the change gear ratio of the stepless speed change gear mechanism 8 within the overlap range a.

Figure 11:
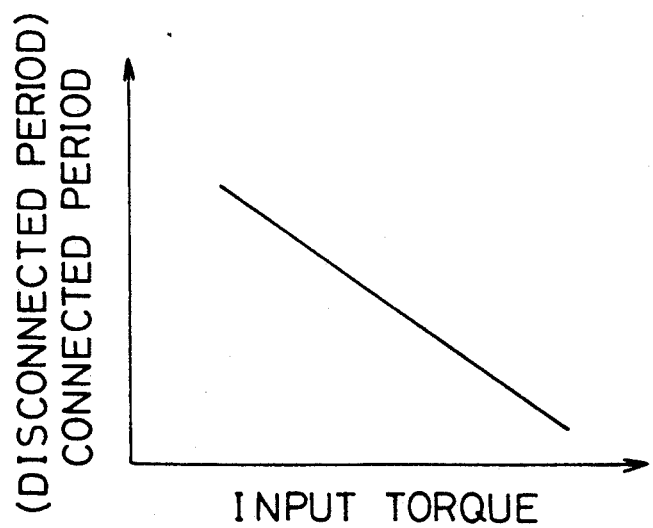

The operation speed control means 66 controls the third duty solenoid valve 59 at switch-over of the path switching clutch 2 so as to retard a switch-over operation speed as the input torque of the clutch 2 detected by the torque detecting means 67 (as described later) decreases. In other words, the operation speed control means 66 controls, as shown in FIG. 11, the third duty solenoid valve 59 so as to lengthen the period of the connected state (or the disconnected state) as the input torque decreases. Specifically, working oil pressures P1, P2 to the clutch 2 as shown in FIGS. 12 and 13 and the varying ratios K1, K2 thereof are set according to the input torque, namely the working oil pressure varying ratios K1, K2 are decreased as the input torque decreases (two-dotted chain lines in FIGS. 12 and 13).

The torque detecting means 67 detects the input torque to the path switching clutch 2 at the switch-over operation of the clutch 2, in detail, calculates the input torque based on, for example, the throttle opening, engine rpm, speed ratio of the torque convertor 5, or the like. The torque change ratio detecting means 68 is composed of, for example, a differentiation circuit and calculates the change ratio by differentiating once the input torque of the clutch 2 detected by the torque detecting means 67.

Figure 14:
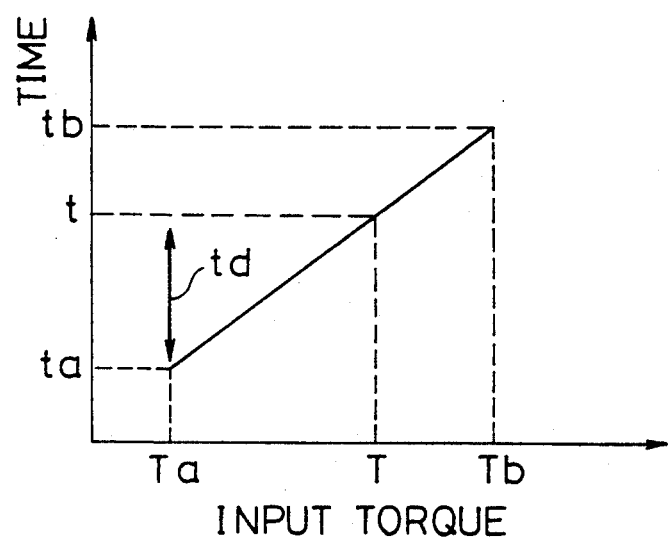
Figure 15:
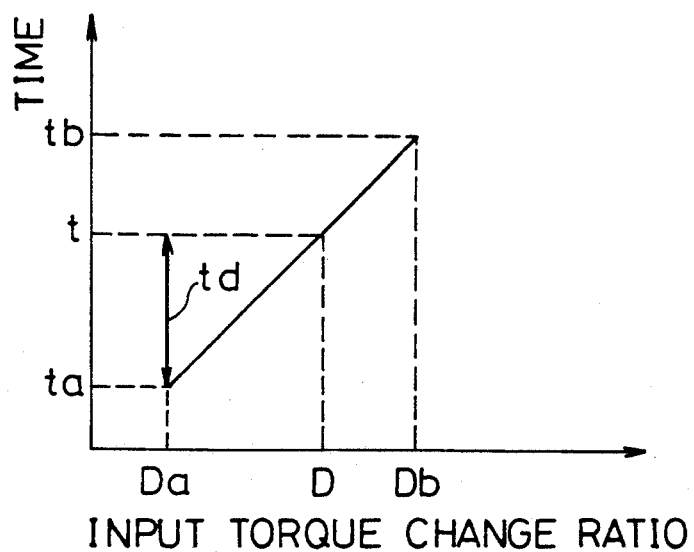

The switch-over point control means 69 controls to adjust the switch-over point of the clutch 2 according to the input torque of the clutch 2 detected by the respective detecting means 67, 68 and the change ratio thereof at the switch-over operation of the clutch 2, particularly, at the switch-over operation from the torque convertor operation state to the toroidal operation state. In this embodiment, as shown in FIGS. 14 and 15, the switch-over point control means 69 controls to retard the switch-over point as the input torque or input torque change ratio increases. In detail, the operation state is switched into the toroidal one at the time ta when the driving condition reaches to the toroidal range when the input torque or input torque change ratio is substantially the minimum value Ta or Da. The operation state is switched into the toroidal one at the time tb when the driving condition gets out from the torque converter range when the input torque or the input torque change ratio is substantially the maximum value Tb or Db. The switch-over point is linearly retarded according to the increase of the input torque or the input torque change ratio when the input torque is more than Ta and less than Tb or the input torque change ratio is more than Da and less than Db.

The abrupt acceleration detecting means 70 detects an abrupt acceleration state of the engine output based on the change ratio of the throttle opening. The correction means 71 corrects the control of the path switch-over control means 64 so as to switch into the torque convertor operation state when the detecting means 70 detects an abrupt acceleration state while the vehicle runs in the toroidal operation state.

The description is made about the control of the ECU 61 with reference to the flow chart in FIG. 16.

In the flow chart, at a step S1 signals of the vehicle speed and the throttle opening TVO, and the like are read in. At a step S2 judged is whether the operation state is in the toroidal one, i.e., whether the path switching clutch 2 is connected.

When the judge is NO, namely, the operation state is in the torque convertor one at the step S2, judged at a step S3 is whether the driving condition of the vehicle is moved into the toroidal range on the map. When the judge is NO, the torque converter operation state is maintained at a step S9, then the flow returns.

When the judge at the step S3 is YES, each change gear ratio of the speed change units 31, 32 is changed at a step S4 so as to conform the rotating speed of input side and that of the output side of the path switching clutch 2 to each other by duty-controlling the second duty solenoid valve 57 during the clutch 2 disconnected. Then, the input torque and the input torque change ratio of the path switching clutch 2 are calculated based on the throttle opening at a step S5. At a step S6 the switch-over point td of the path switching clutch 2 is set according to the input torque or the input torque change ratio (refer to FIGS. 14 and 15) and the oil pressure P1 and the change ratio K1 thereof to the path switching clutch 2 are set according to the input torque (refer to FIG. 12). Wherein, the switch-over point td is so set as to be retarded as the input torque or input torque change ratio increases and the connected period $\Delta t1$ is so set to be lengthened as the input torque decreases.

Then, the third duty solenoid valve 59 is controlled to supply the oil pressure to the path switching clutch 2 according to the above setting at a step S7, and the operation state is into the toroidal one by connecting the path switching clutch 2 at a step S8, then the flow returns.

On the other hand, when the judge at the step S2 is YES, namely, the operation state is in the toroidal one, judged at a step S10 is whether the driving condition of the vehicle is moved into the torque convertor range on the map. When the judge is YES, the input torque of the path switching clutch 2 is calculated at a step S11, then the oil pressure P2 and the change ratio K2 thereof to the path switching clutch 2 are set at a step S12 according to the input torque at the step S11 (refer to FIG. 13). Wherein the connected period $\Delta t2$ is so set as to be lengthened as the input torque decreases.

At a step S13 the third duty solenoid valve 59 is controlled so as to discharge the oil pressure from the path switching clutch 2 according to the setting at the step S13, then the operation sate is into the torque converter one by disconnecting the path switching clutch 2 at a step S14. Then the flow returns.

When the judge at the step S10 is NO, the target change gear ratio or the target rotating speed is obtained according to the vehicle speed at the time, or the like at a step S15, then judged at a step S16 is whether the obtained value at the step S15 is within the overlap range a in FIG. 10. When the judge at the step S16 is YES, a timer t is cleared to zero at a step S17. After a unit time $\Delta T$ passes, counting up the timer t at steps S18 and S19, the throttle valve opening TVO is read in at a step S20, then the throttle opening change ratio $\Delta$ TVO is calculated at a step S21 based on a difference between the throttle opening previously read in at the step S2 and that at the step S20.

Then, judged at a step S22 is whether the throttle opening change ratio $\Delta$ TVO is equal to or more than a set value K in order to check whether the engine output is in an abrupt acceleration state. When the judge at the step S22 is YES, the operation state is switched into the torque converter one by disconnecting the path switching clutch 2 at a step S23. In other word, even if the driving condition is in a driving range to be maintain the toroidal operation state according to the map for fundamental control, the operation state is switched into the torque converter one when judged are that the change gear ratio is within the overlap range a and that the engine 1 is in the abrupt acceleration state. Then the flow returns.

On the other hand, when judged at the step S22 is that the engine 1 is not in the abrupt acceleration state, the toroidal operation state is maintained at a step S24. When judged at the step S16 is that the target change gear ratio is not within the overlap range a, the operation state is also maintained in the toroidal one, going to the step S24.

The operation and effects in the first embodiment are referred to. The power transmitting paths is controlled to be switched over fundamentally based on the predetermined map of the driving range (refer to FIG. 10). In a specific driving range such as low vehicle speed range, the operation state is in the torque converter one by disconnecting the path switching clutch 2, thus a comparatively large change gear ratio and an effective torque increasing function of the torque converter 5 can be obtained. In the other driving range, since the operation state is in the toroidal one by connecting the path switching clutch 2, a transmission loss owing to the torque converter 5 is avoided, and the change gear ratio is continuously, appropriately adjusted at a range of a comparatively small change gear ratio by the stepless speed change gear mechanism 8, reducing the fuel consumption.

In case where the switch-over operation is carried out from the disconnected state to the connected state of the path switching clutch 2, namely switch-over from the torque converter operation state to the toroidal one, the clutch 2 is switched after adjusted to conform the rotating speeds of input side and output side of the clutch 2. Thus, the operation sate is smoothly moved into the toroidal one by the connection of the clutch 2, preventing sliding of the clutch 2. As a result, a shock at the switch-over of the clutch 2 is avoided, enhancing the durability of the clutch 2.

In addition, in this case, the supply of the oil pressure is adjusted according to the input torque of the path switching clutch 2. Consequently, since the connecting speed is retarded as the input torque decreases, a shock accompanied by the switch-over between the power transmitting paths is reduced. Since the input and output rotating speeds of the path switching clutch 2 is conformed to each other by adjusting the rotating speeds prior to the above switch-over operation and the rotating speed change during switch-over operation is small with small input torque, the path switching clutch 2 is prevented from worn-out by sliding even upon a long connected period. When the input torque is large, though a speed change responsibility to the acceleration operation may become worse and the change of the input rotating speed during the switch-over operation may cause to slide the path switching clutch 2 upon a long connected period, such the predicaments can be avoided by high connecting speed, ensuring the responsibility.

In general, when the input torque or the input torque change ratio of the path switching clutch 2 is large, a driver desires to accelerate the vehicle. In case where the switch-over point td of the clutch 2 into the toroidal operation state is retarded according to the input torque or the input torque change ratio as in the present embodiment, torque increasing function of the torque converter 5 can be effectively utilized to that extent, ensuring the acceleratability.

When the switch-over operation is carried out from the connected state to the disconnected state of the path switching clutch 2 (from the toroidal operation state to the torque converter one), since the clutch 2 is in the connected state before switch-over and the rotating speeds of the input side and output side are conformed to each other, the rotating speed adjustment is not performed. Nevertheless, the discharge of the oil pressure is adjusted according to the input torque of the clutch 2 so as to control the switching speed to retard the disconnecting speed as the input torque decreases and to accelerate the disconnecting speed as the input torque increases. Accordingly, as well as the case of switch-over to the connected state of the clutch 2, a shock owing to the switch-over when the input torque is small is reduced, ensuring the acceleratability at the large input torque.

Further, when an abrupt acceleration state of the engine 1 is detected during the toroidal operation state, the operation state is changed into the torque converter one by switching the path switching clutch 2 from the connected state to the disconnected state. Thus, the change of the change gear ratio and torque increase in the torque converter 5 according to the acceleration enhance the acceleratability. Particularly, when a preferred control is performed as in the present embodiment, namely, when the operation state is controlled to be switched into the torque converter operation state at the abrupt acceleration when the target change gear ratio is within the overlap range a, the driving condition is smoothly moved into the abrupt acceleration state and a discontinuous change of the change gear ratio is avoided, enhancing the acceleratability.

Figure 17:
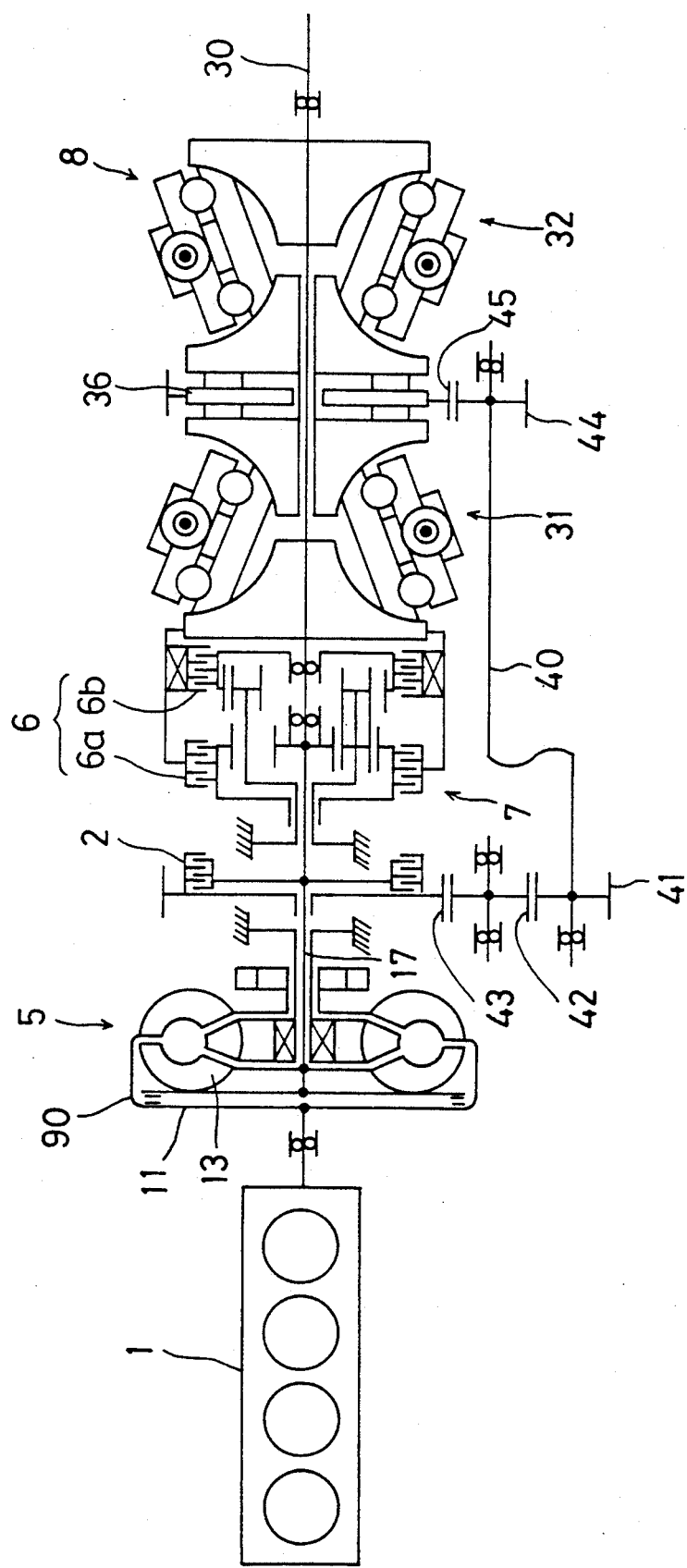
FIGS. 17 and 18 show a second embodiment, in which FIG. 17 corresponds to FIG. 1 and FIG. 18 corresponds to FIG. 2.
Figure 18:
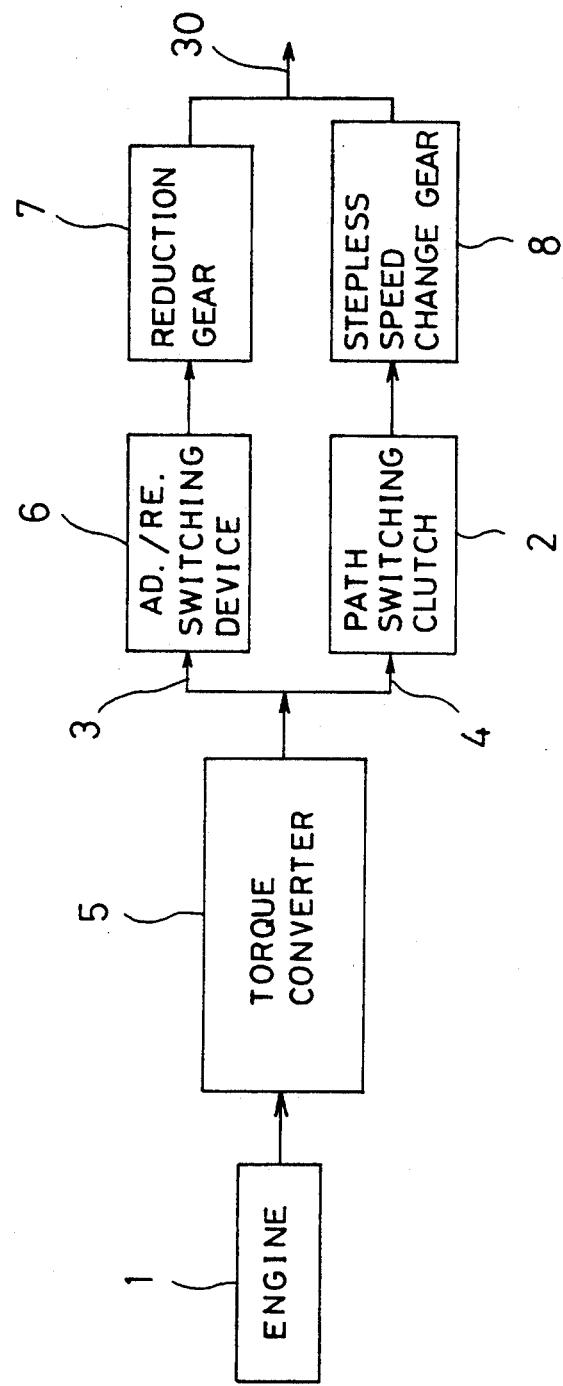

FIGS. 17 and 18 show a construction of the power transmitting paths of the power transmission device according to a second embodiment. In the second embodiment, the torque converter 5 includes a lockup clutch 90. The first power transmitting path 3 with the advance/reverse switching device 6 and the reduction gear 7 and the second power transmitting path 4 with the stepless speed change gear mechanism 8 connected to the torque converter 5 via the path switching clutch 2 are provided in parallel and near the output shaft 30 than the torque converter 5.

In detail, disposed between the pump cover 11 and the turbine liner 13 of the torque converter 5 is the lockup clutch 90 for directly connecting them. The advance/reverse switching device 6 and the reduction gear 7 are connected to the turbine shaft 17 as in the first embodiment (refer to FIGS. 1 and 2), and the gear 43 on the second power transmitting path 4 side is connected to the turbine shaft 17 via the path switching clutch 2 for transmitting a power. Also as in the first embodiment, the gear 43 engages with the gear 41 at the front end of the bypass shaft 40 via the idle gear 42 and the speed change units 31, 32 are connected to the rear end of the bypass shaft 40 via the gears 44, 45 and the intermediate disk 36.

In the second embodiment, the power is transmitted from the output side of the torque converter 5 to the wheel side via the first power transmitting path 3 when the path transmitted to the wheel side via the second power transmitting path 4 when the clutch 2 is connected without the first power transmitting path substantially working. Whichever of the paths 3, 4 is used for power transmission, optional election is made possible between states that the power is transmitted via the torque converter 5 by disconnecting the lockup clutch 90 and that the power is transmitted bypassing the torque converter 5 by connecting the lockup clutch 90. Accordingly, for the fundamental control, only the path switching clutch 2 and lockup clutch 90 are switched over respectively according to the driving condition.

Figure 9:
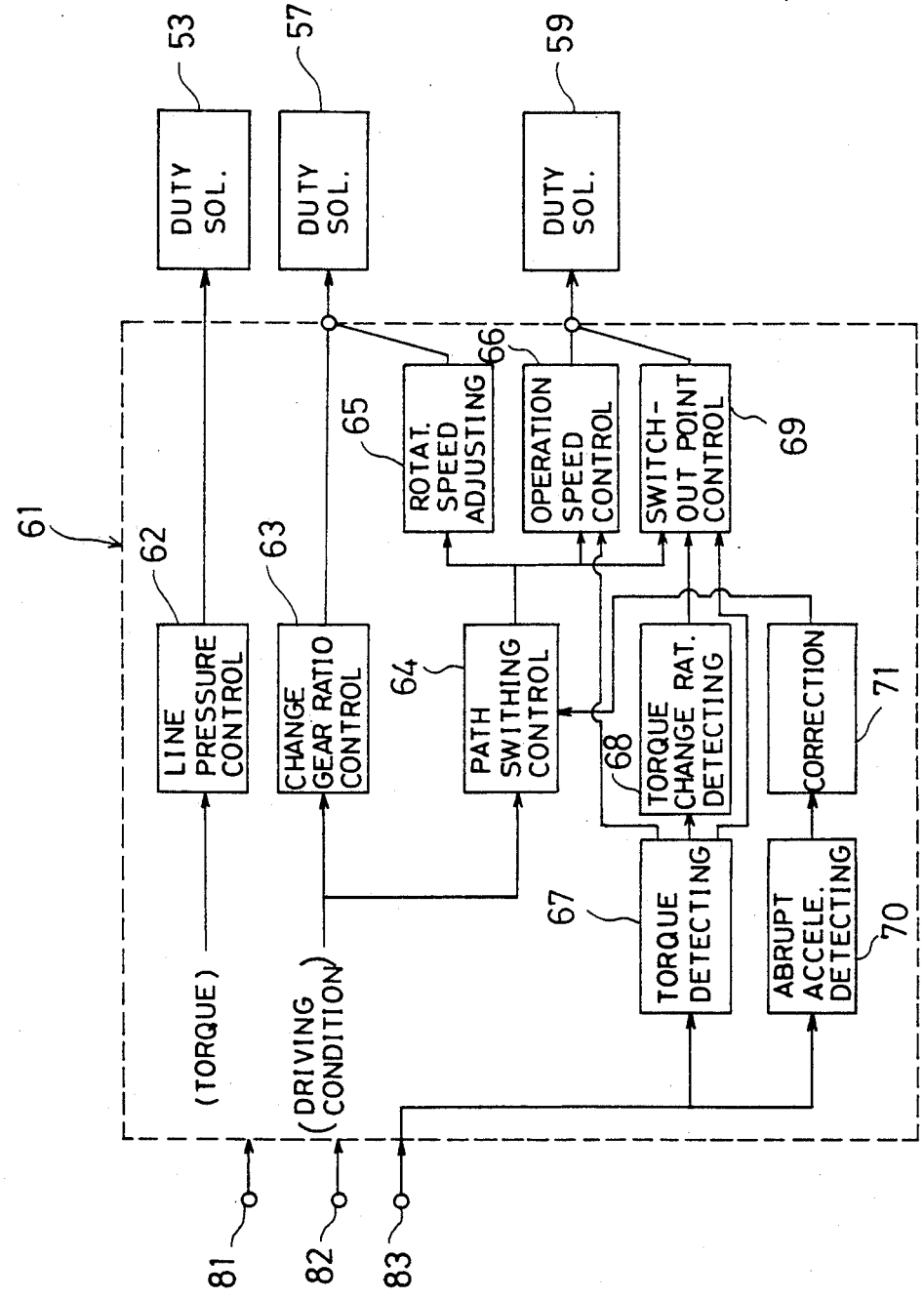

In case of the above construction, the controls shown in FIGS. 9 and 16 are also performed at the switch-over operation of the path switching clutch 2 as well as in the first embodiment.

Figure 19:
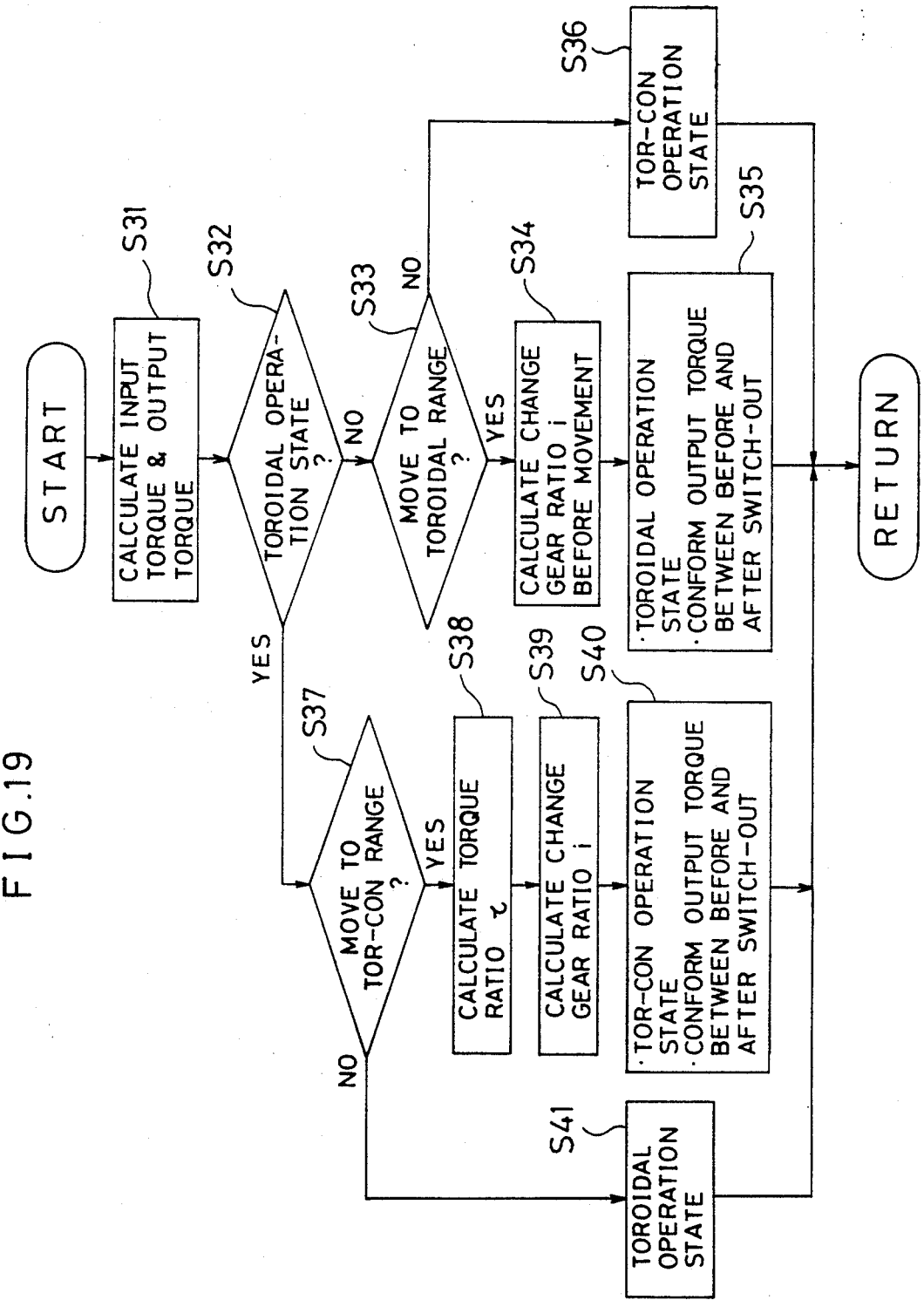
FIG. 19 is a flow chart for a switch-over control of the path switching clutch in a modified example.

The present invention is not limited to first and second embodiments and includes variable modified examples. For example, the rotating speed adjusting means 65 for adjusting to approximately conform the rotating speeds of the input side and output side of the clutch 2 to each other is provided (see FIG. 9) as the rotational condition abrupt change restraining means for restraining an abrupt change of the rotational condition of the engine output shaft at the switch-over operation of the clutch 2, however output torque control means may be provided for controlling to approximately conform the output torques to the wheel side between before and after the switch-over operation of the clutch 2, instead of or together with the rotating speed adjusting means 65. FIG. 19 shows a flow chart for the control by the ECU 61 in case with the output torque control means.

In this flow chart, at a step S31 input torque (equal to the engine output torque) and output torque at the time in the power transmission device are calculated based on the detected signals of sensors, then judged at a step S32 is whether the operation state is in the toroidal one at the time.

When the judge at the step S32 is NO, namely, when the operation state is in the torque converter one, judged at a step S33 is whether the driving condition of the vehicle is moved into the toroidal range on the map. When the judge at the step S33 is NO, the torque converter operation state is maintained at a step S36, then the flow returns.

When the judge at the step S33 is YES, the present speed ratio i, i.e., the change gear ratio immediately before the movement to the toroidal operation state is calculated at a step S34. The change gear ratio i is calculated by multiplying a torque ratio of the previously calculated input and output torques and a gear ratio of the reduction gear 7. Then, at a step S35 the clutch 2 is connected to be in the toroidal operation state by controlling the third duty solenoid valve 59 so as to supply the oil pressure to the path switching clutch 2. At that time, the change gear ratio of the stepless speed change gear mechanism 8 is adjusted beforehand to conform the output torques between before and after the clutch 2 switched-over, then the flow returns.

On the other hand, when the judge at the step S32 is YES, namely when the operation state is in the toroidal one, judged at a step S37 is whether the driving condition of the vehicle is moved into the torque converter range on the map. When the judge at the step S37 is NO, the toroidal operation state is maintained at a step S41, then the flow returns.

When the judge at the step S37 is YES, calculated at a step S38 is a torque ratio $\tau$ immediately after the movement to the torque converter operation state. Wherein, a torque ratio immediately before the movement to the torque converter operation state is always 1. Therefore, the torque ratio $\tau$ immediately after the movement to the torque converter operation state is estimated as follows.

First, the engine rpm ESP is calculated with numerical operation based on the below torque balance theoretical formula (1).

$$Te - Plos - C \cdot D^5 \cdot (ESP/10^3)^2 = 0 \tag{1}$$

Wherein, Te is an engine torque and a functional value between the engine rpm ESP and the throttle opening TVO (Te=f1(ESP,TVO)). Plos is an oil pump loss and a functional value between the engine rpm ESP and the line pressure PL (Plos=f2(ESP,PL)). C is a capacity coefficient of the torque converter and a functional value between the engine rpm ESP and the turbine rpm TSP (C=f3(ESP,TSP)). D is a diameter of the torque converter.

TVO and D are known value and TSP can be calculated from the vehicle speed. Therefore, since only ESP is the unknown value in the formula (1), ESP can be calculated with the numerical operation.

Figure 20:
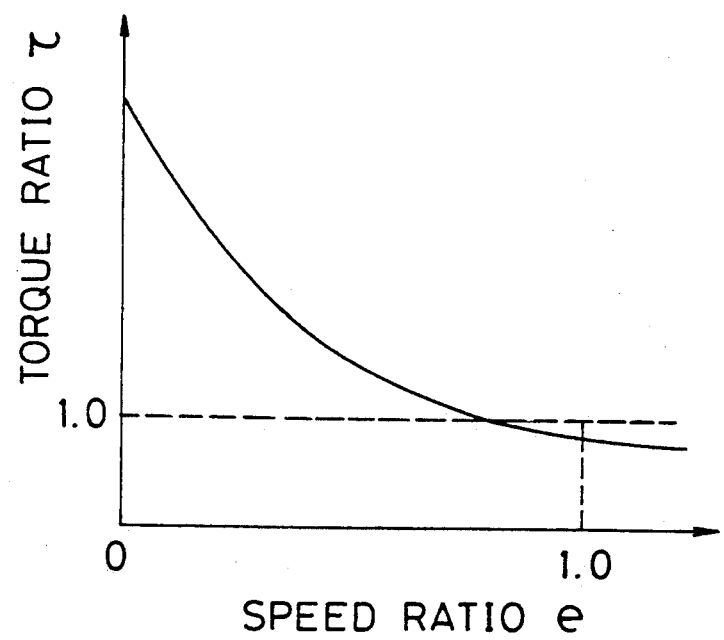
FIG. 20 is a graph showing a relation between change gear ratio and a torque ratio.

After obtaining ESP, the speed ratio e (=TSP/ESP) is calculated, then the torque ratio $\tau$ is obtained from the characteristic indicated in FIG. 20 according to the speed ratio e.

After calculating the torque ratio $\tau$ immediately after the movement into the torque converter operation state as the above order, the change gear ratio i immediately before the movement is obtained at a step S39 by multiplying the torque ratio $\tau$ and the gear ratio of the reduction gear 7. The path switching clutch 2 is disconnected to be in the torque converter operation state at a step S40 by controlling the third duty solenoid valve 59 to discharge the oil pressure from the clutch 2. At the time, the change gear ratio of the stepless speed change gear mechanism 8 is changed beforehand to the previously obtained value i so as to approximately conform the output torques between before and after the clutch 2 switched-over. Then the flow returns.

According to the above control, since the output torques to the wheel side are conformed to each other between before and after the clutch 2 switched-over, a shock owing to the change of the output torque at switch-over is prevented, enhancing the running stability.

Figure 21:
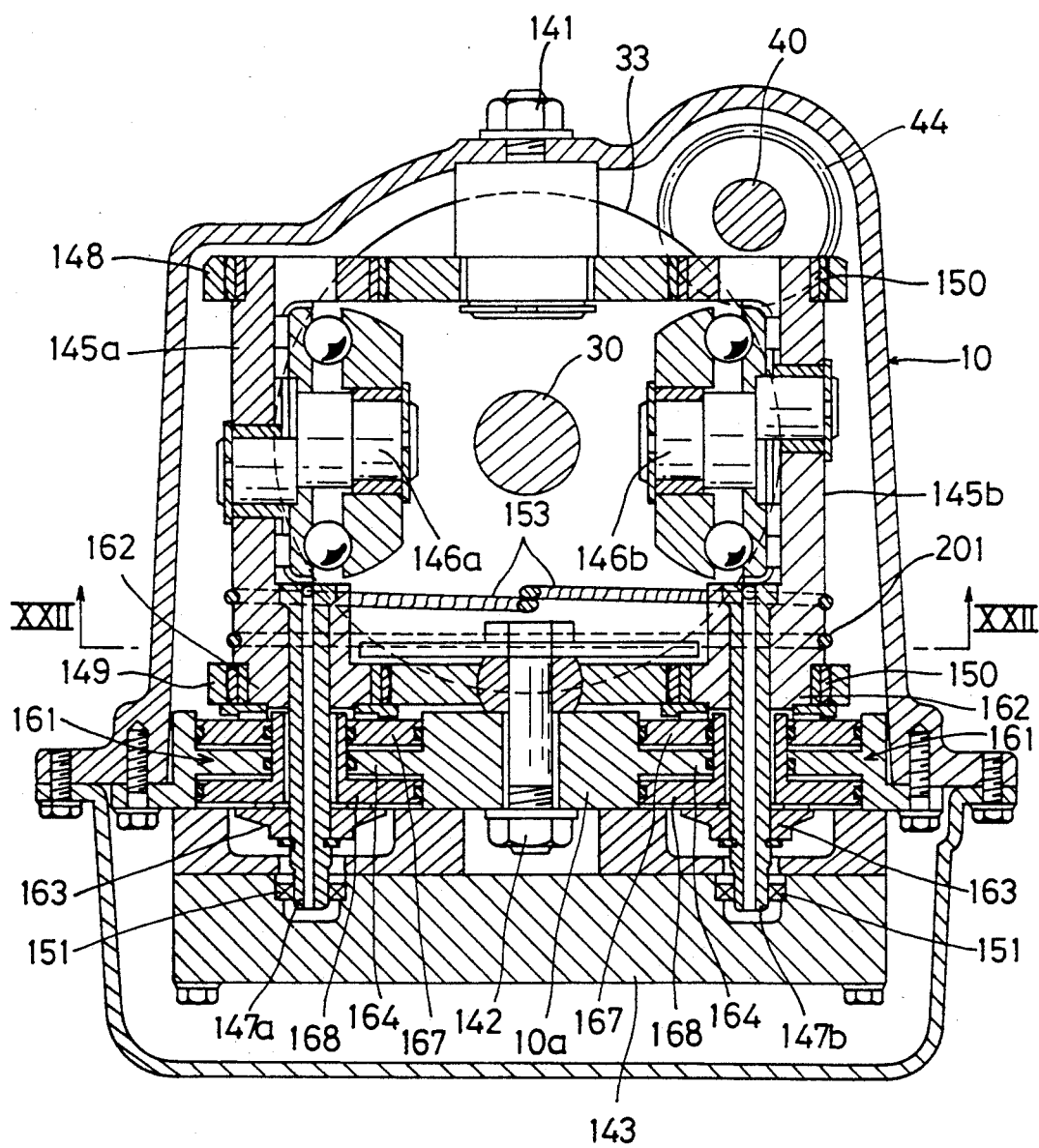
FIGS. 21 and 22 show a modified example of a stepless speed change gear mechanism, in which FIG. 21 corresponds to FIG. 3 and FIG. 22 corresponds to FIG. 4 seen along XXII—XXII in FIG. 21.
Figure 22:
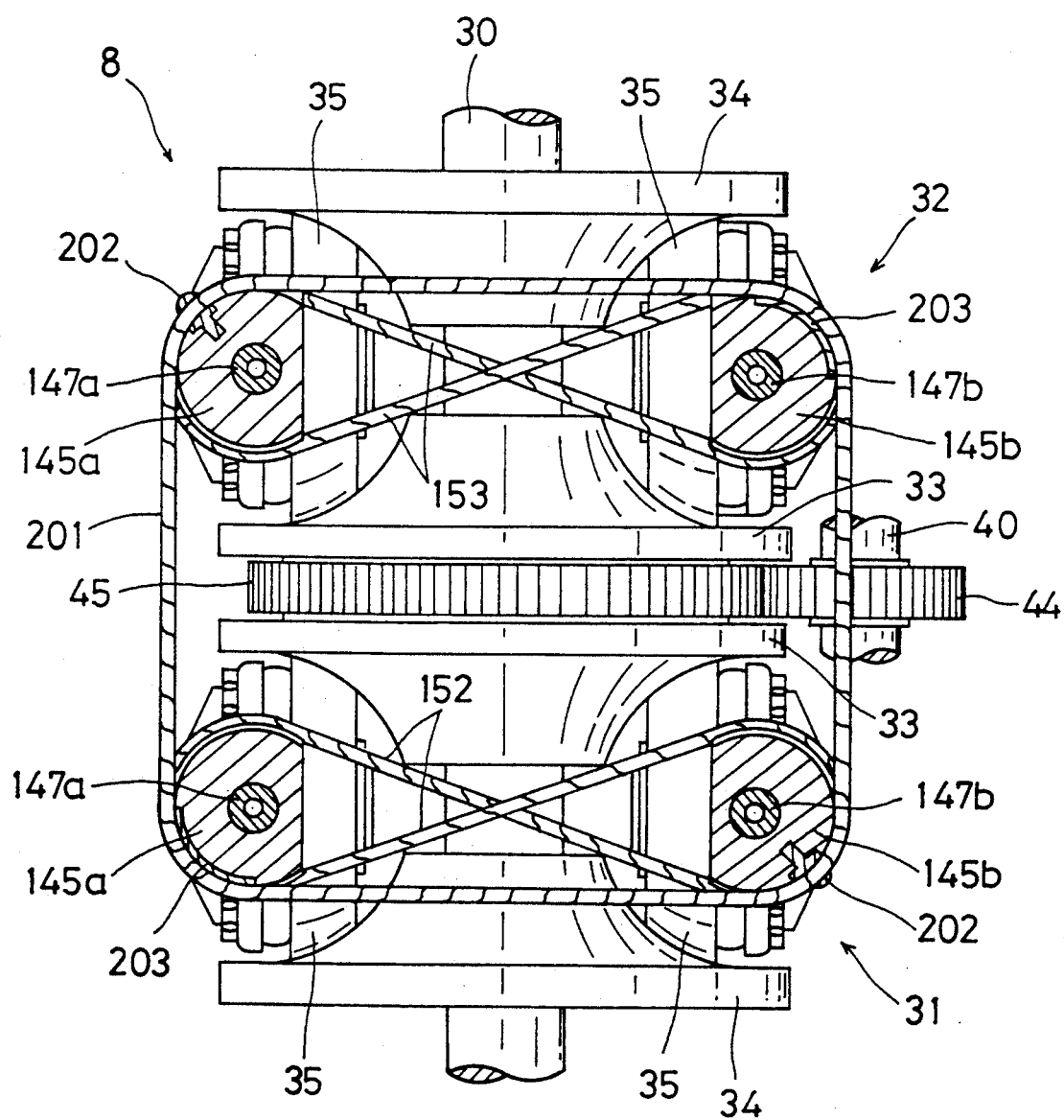

FIGS. 21 and 22 show a modified example of the stepless speed change gear mechanism 8. In the modified example, the stepless speed change gear mechanism 8 is, as in the first embodiment (refer to FIGS. 3 and 4), composed of first and second speed change units 31, 32 of the toroidal type stepless speed change gear mechanism which are arranged coaxially with the output shaft 30 in series. The difference in the modified example from the first embodiment is only a wound parts of a third wire 201 (corresponding to 155 in the first embodiment) as the third winding member to the trunnions 145a, 145b as a pair of the roller support members in each speed change unit 31, 32.

In detail, the third wire 201 is wound to the outer periphery of each pair of the trunnions 145a, 145b of the respective speed change units 31, 32. Further, the third wire 201 is fixed by respective fixing members 202 to the second trunnion 145b of the first speed change unit 31 and the first trunnion 145a of the second speed change unit 32 both which rotate in the same direction with each other. The third wire 201 is slidable on the first trunnion 145a of the first speed change unit 31 and the second trunnion 145b of the second speed change unit 32 which rotate in the opposite directions to each other by sliding members 203 made of a low friction material such as teflon and which are respectively mounted thereto. Since the other construction of the stepless speed change gear mechanism 8 such as the wound parts of the first and second wires 152, 153 is almost the same as in the first embodiment, the description thereof is omitted, numbering the same reference numerals to the same members.

According to this modified example, similar to the first embodiment, if something wrong happens in the hydraulic system for inclining one of the rollers 35 of the first and second speed change units 31, 32, all of the rollers 35 of both speed change units 31, 32 are inclined to a set inclined angle, synchronizing one another. Further, since the third wire 201 is wound to the outer peripheries of each trunnions 145a, 145b, the third wire 201 is wound inward than the outer peripheries of the input and output disks 33, 34, while an interference with the outer peripheries of the disks 33, 34 can be avoided, thus compactmizing the device itself.

Figure 23:
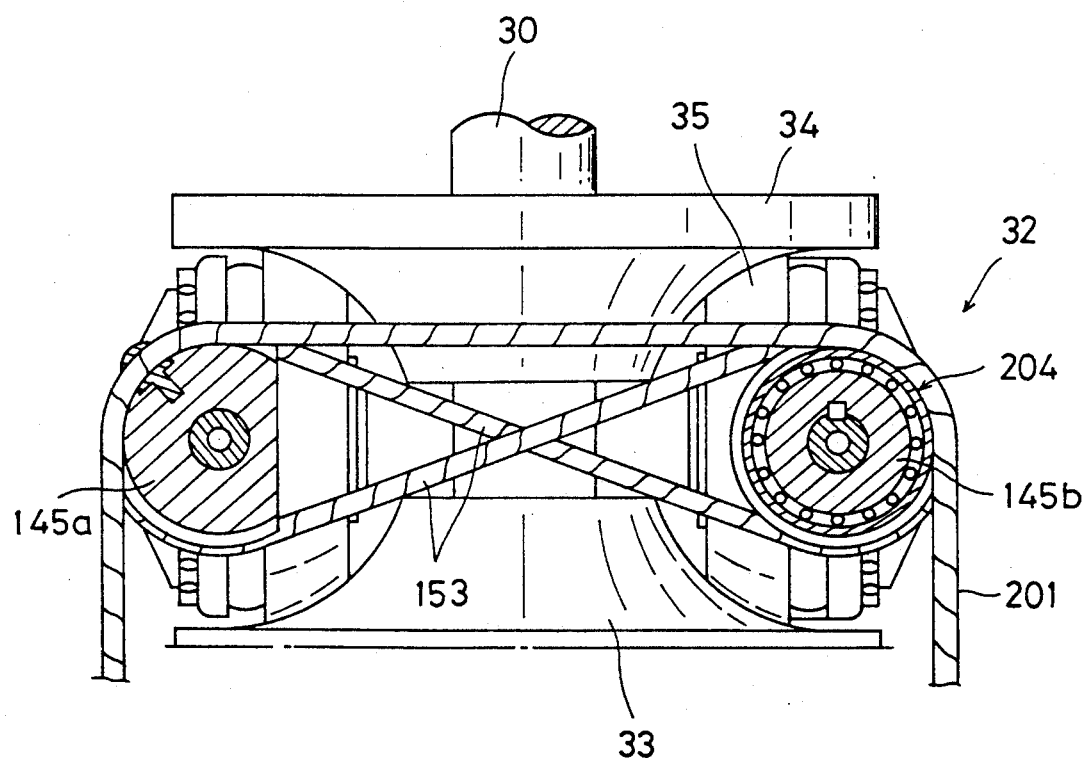
FIG. 23 shows another modified example of a third wire wound to a trunnion and corresponds to FIG. 5.

In the above modified example, the third wire 201 can be slidable on the first trunnion 145a of the first speed change unit 31 and the second trunnion 145b of the second speed change unit by, as shown in FIG. 23, providing a bearing 204 to the trunnion 145b, instead of the sliding member 203.

Figure 24:
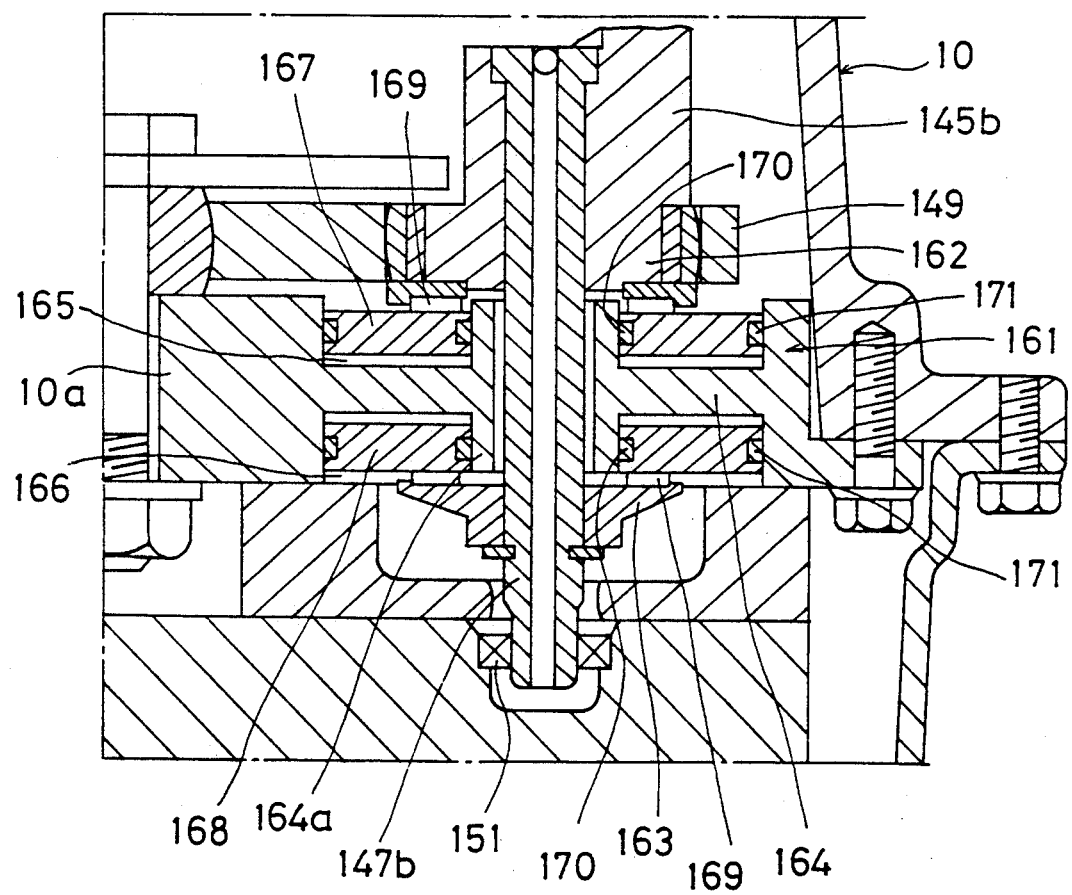
FIG. 24 is a sectional view showing the other modified example of the hydraulic actuator.

FIG. 24 shows another modified example of the hydraulic actuator 161 of each speed change unit 31, 32. In this modified example, formed integrally at the fixed flange 164 of the hydraulic actuator 161 is a cylindrical extension part 164a extending in a vertical direction of the shaft member 147b of the trunnion 145b at a position located on the outer periphery of the shaft member 147b, with a set space left. The upper and lower peripheral surfaces of the extension part 164a are respectively slidably oil-sealed to the inner peripheral surface of one of the pistons 167 and to that of the other piston 167 by respective oil rings 170. The other construction of the hydraulic actuator 161 is the same as that in the first embodiment (see FIG. 7), thus the description is omitted, numbering the same reference numerals to the same members.

We claim:

1. A power transmission device for a vehicle, comprising:
   a first power transmitting path for transmitting an engine output to a wheel side via a reduction gear;
   a second power transiting path for transmitting the engine output to the wheel side via a stepless speed change gear mechanism;
   a friction element for switching said power transmitting paths so as to transmit by one of said paths;
   switch-over control means for controlling a switch-over operation of said friction element according to a driving condition of the vehicle; and
   rotational condition abrupt change restraining means for restraining an abrupt change of a rotational condition of an engine output shaft at a switch-over between said power transmitting paths.

2. A power transmission device for a vehicle according to claim 1, wherein said rotational condition abrupt change restraining means is rotating speed adjusting means for adjusting to approximately conform a rotating speed of an input side of said friction element and a rotating speed of an output side thereof to each other at switch-over between said power transmitting paths.

3. A power transmission device for a vehicle according to claim 1, wherein said rotational condition abrupt change restraining means is output torque control means for controlling to approximately conform an output torque to the wheel side between before and after switch-over of said power transmitting paths to each other.

4. A power transmission device for a vehicle according to claim 1, wherein a maximum change gear ratio of said second power transmitting path is made larger than a minimum change gear ratio of said first power transmitting path to provide an overlap range between change gear ratio ranges of each power transmitting path.

5. A power transmission device for a vehicle according to claim 2, comprising:
   torque detecting means for detecting an input torque at a switch-over operation of said friction element; and
   operation speed control means for controlling to retard a switch-over operation speed of said friction element as the input torque decreases.

6. A power transmission device for a vehicle according to claim 4, wherein said switch-over control means operates said friction element to switch between said power transmitting paths when a driving condition of the vehicle is in the overlap range, and said rotational condition abrupt change restraining means is rotating speed adjusting means for adjusting to approximately conform a rotating speed of an input side of said friction element and a rotating speed of an output side thereof to each other at a switch-over of said power transmitting paths.

7. A power transmission device for a vehicle according to claim 4, comprising:
   detecting means for detecting an abrupt acceleration condition of the engine output; and
   correction means for correcting the control of said switch-over control means so that when said detecting means detects an abrupt acceleration condition during a vehicle run with a power transmitted condition by said second power transmitting path, the power transmitted condition is switched to that by said first power transmitting path.

8. A power transmission device for a vehicle according to claim 6, wherein said first power transmitting path passes through a torque converter and said second power transmitting path bypasses the torque converter.

9. A power transmission device for a vehicle according to claim 8, comprising:
   torque detecting means for detecting an input torque at a switch-over operation of said friction element; and
   switch-over point control means for controlling to retard a switch-over point of said friction element as the input torque increases.

10. A power transmission device for a vehicle according to claim 8, comprising:
    torque change ratio detecting means for detecting an change ratio of an input torque at switch-over operation of said friction element; and
    switch-over point control means for controlling to retard a switch-over point of said friction element as the input torque change ratio increases.

11. A power transmission device for a vehicle according to claim 8, comprising:

torque detecting means for detecting an input torque at a switch-over operation of said friction element; and operation speed controlling means for controlling to retard switch-over operation speed of said friction element as the input torque decreases.

12. A power transmission device for a vehicle according to claim 8, wherein said stepless speed change gear mechanism is of a toroidal type and composed of a first speed change unit and second speed change unit which are arranged coaxially, each said speed change unit includes a pair of input and output disks opposed to each other on a same shaft, a pair of inclinable rollers disposed between said input and output disks, a pair of roller support members corresponding to said respective rollers, and actuator, said rollers rotates by contacting with both disks and transmits a rotation of said input disk to said output disk with the speed steplessly changed according to an inclined angle thereof, said roller support members is axially movable and supports rotatably said corresponding rollers, and said actuator inclines said rollers by axially moving each roller support member.

13. A power transmission device for a vehicle according to claim 12, comprising:

a first winding member wound between a pair of said roller support members of said first speed change unit so as to rotate them in opposite directions to each other;

a second winding member wound between a pair of said roller support members of said second speed change unit so as to rotate them in opposite directions to each other; and a third winding member wound between one of said roller support members of said first speed change unit and one of said roller support members of said second speed change unit so as to rotate them in a same direction, said third winding member transmitting rotation of both support members each other so as to change the change gear ratios of both speed change units to be equal.

14. A power transmission device for a vehicle according to claim 12, comprising:

a first winding member wound between a pair of said roller support members of said first speed change unit so as to rotate them in opposite directions to each other;

a second winding member wound between a pair of said roller support members of said second speed change unit so as to rotate them in opposite directions to each other; and a third winding member wound to an outer peripheral parts of each roller support member of said first and second speed change units, said third winding member being fixed to two roller support members of said roller support members which rotate in a same direction, and being slidable to two roller support members thereof which rotate in the opposite directions.

15. A power transmission device for a vehicle according to claim 14, wherein said first, second and third winding members are wound to said respective roller support members, gathered toward each central axis of said input and output disks so as to locate inside than the outer peripheries of said input and output disks of said first and second speed change units.

16. A power transmission device for a vehicle according to claim 13, wherein said first and second winding members of each of said first and second speed change units are wound to spiral engaging grooves provided on each said roller support member, said first and second winding members not being in contact with respective crossing parts thereof, separating therefrom.

17. A power transmission device for a vehicle, according to claim 12, wherein said actuator includes a pair of spaced movable flanges fixed to a shaft member provided at said roller support members, a fixed flange fixed on a casing side of said speed change gear mechanism so as to be interposed between said movable flanges, a pair of pistons respectively interposed between said fixed flange and said respective movable flanges to form respective hydraulic chambers between said fixed flange, and oil pressure supply means for supplying oil pressure to each hydraulic chamber to axially move said roller support members by pressing each said piston to said movable flange.

18. A power transmission device for a vehicle according to claim 17, wherein a cylindrical extension part extending in an axial direction of each said shaft member of said roller support members is integrally formed on said fixed flange, with a set space left from the shaft member of said roller support member, at a point located on an outer periphery of said shaft member of said roller support members, and inner surfaces of each said piston are slidably oil-sealed to an outer peripheral surface of said extension part.

19. A power transmission device for a vehicle according to claim 17, wherein a cylindrical extension part is integrally formed on one of a pair of said pistons, said extension part being spaced to the shaft member of said roller support member and extending in an axial direction of said shaft member to a side of the other piston over said fixed flange, an inner peripheral surface of said fixed flange and an inner peripheral surface of said other piston are slidably oil-sealed to an outer peripheral surface of said extension part.

* * * * *